(12) United States Patent
Nakatani

(10) Patent No.: US 9,319,494 B2
(45) Date of Patent: Apr. 19, 2016

(54) WIRELESS MODULE AND WIRELESS COMMUNICATION APPARATUS

(71) Applicant: Panasonic Corporation, Osaka (JP)

(72) Inventor: Toshifumi Nakatani, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 14/378,068

(22) PCT Filed: Dec. 11, 2013

(86) PCT No.: PCT/JP2013/007291
§ 371 (c)(1),
(2) Date: Aug. 11, 2014

(87) PCT Pub. No.: WO2014/091758
PCT Pub. Date: Jun. 19, 2014

(65) Prior Publication Data
US 2015/0045091 A1    Feb. 12, 2015

(30) Foreign Application Priority Data

Dec. 13, 2012 (JP) ................. 2012-272647

(51) Int. Cl.
*H04B 7/00* (2006.01)
*H04M 1/02* (2006.01)
(Continued)

(52) U.S. Cl.
CPC ............. *H04M 1/0202* (2013.01); *H02J 5/005* (2013.01); *H02J 7/025* (2013.01); *H04B 5/0031* (2013.01);
(Continued)

(58) Field of Classification Search
CPC .. H02J 7/0096; H02J 7/025; H02J 2007/0096

USPC .......... 455/41.1, 41.2, 41.3, 556.1, 573, 572, 455/69, 522, 557
See application file for complete search history.

(56) References Cited

U.S. PATENT DOCUMENTS 8,089,245 B2   1/2012  Kato
8,159,183 B2   4/2012  Choi
(Continued)

FOREIGN PATENT DOCUMENTS

CN   101304178 A   11/2008
JP   10-032276 A    2/1998
(Continued)

OTHER PUBLICATIONS

International Search Report for Application No. PCT/JP2013/007291 dated Mar. 18, 2014.
(Continued)

*Primary Examiner* — John J Lee
(74) *Attorney, Agent, or Firm* — Pearne & Gordon LLP

(57) ABSTRACT

Non-contact charging is performed with an opposing apparatus and wireless communication is performed at a high speed with the opposing apparatus by a simple configuration, without performing a highly accurate alignment with the opposing apparatus. The wireless communication apparatus includes a non-contact charging unit and a wireless communication unit. The non-contact charging unit transmits power to the opposing apparatus through a coil in a non-contact manner. The wireless communication unit includes a plurality of antennas. A plurality of antennas are arranged at substantially regular intervals from a center of a central axis of the coil. The wireless communication unit transmits data from the respective antennas by wireless communication when the non-contact charging unit transmits power to the opposing apparatus.

7 Claims, 19 Drawing Sheets

(51) Int. Cl.
  *H04B 5/00* (2006.01)
  *H02J 5/00* (2006.01)
  *H02J 7/02* (2006.01)
  H02J 7/00 (2006.01)
  H04B 7/06 (2006.01)
  H04B 7/08 (2006.01)

(52) U.S. Cl.
  CPC ............ *H04B 5/0037* (2013.01); *H04B 5/0081* (2013.01); *H02J 2007/0096* (2013.01); *H04B 7/0617* (2013.01); *H04B 7/086* (2013.01)

(56) References Cited

U.S. PATENT DOCUMENTS

| | | |
|---|---|---|
| 2008/0164839 A1 | 7/2008 | Kato |
| 2009/0033280 A1 | 2/2009 | Choi |
| 2009/0271047 A1* | 10/2009 | Wakamatsu ............ H02J 5/005 700/295 |
| 2010/0181841 A1 | 7/2010 | Azancot et al. |
| 2011/0025264 A1 | 2/2011 | Mochida et al. |
| 2012/0009869 A1* | 1/2012 | Suzuki ................ H04B 5/0037 455/41.1 |
| 2012/0223588 A1* | 9/2012 | Suzuki .................... H02J 5/005 307/104 |
| 2014/0103871 A1 | 4/2014 | Maikawa et al. |

FOREIGN PATENT DOCUMENTS

| | | |
|---|---|---|
| JP | 2009-141660 A | 6/2009 |
| JP | 2009-247125 A | 10/2009 |
| JP | 2010-051089 A | 3/2010 |
| JP | 2010-517502 A | 5/2010 |
| JP | 2010-288430 A | 12/2010 |
| WO | 2007/089086 A1 | 8/2007 |
| WO | 2012/165242 A1 | 6/2012 |

OTHER PUBLICATIONS

Supplemental European Search Report for Application No. 13862362.4-1852/2933929 PCT/JP2013007291, Dated Nov. 12, 2015.

Search Report issued in Chinese Patent Application No. 2013800082560 dated Jan. 22, 2016.

* cited by examiner

FIG.3
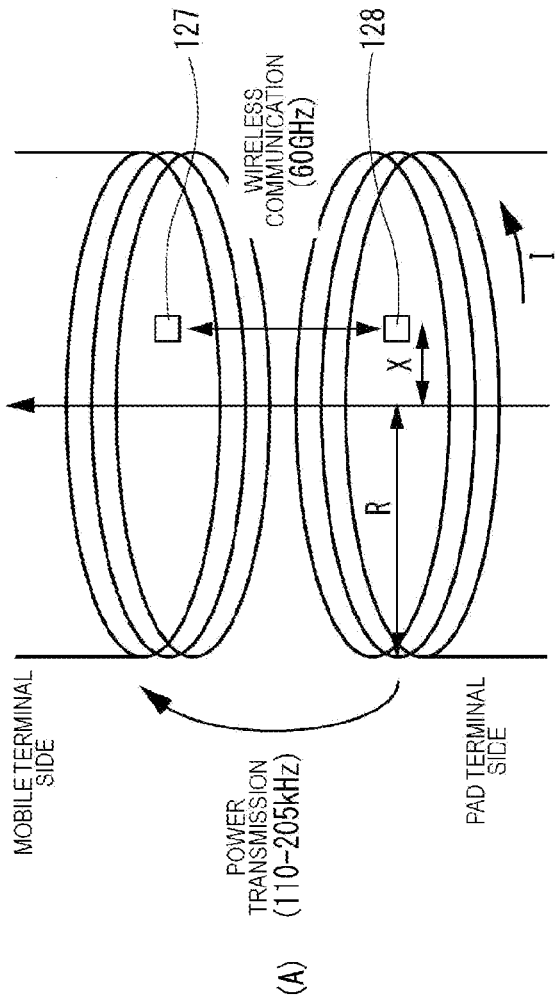
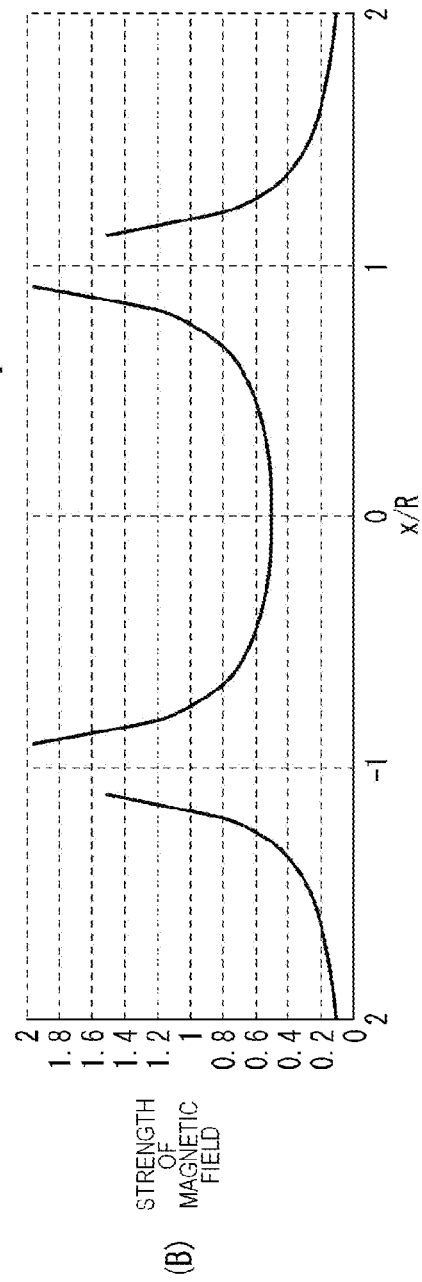

WIRELESS MODULE AND WIRELESS COMMUNICATION APPARATUS

TECHNICAL FIELD

The present invention relates to a wireless module and a wireless communication apparatus, which transmit and receive data by wireless communication.

BACKGROUND ART

In recent years, for example, portable media players, smart phones, and tablet terminals have become widespread as mobile terminals capable of downloading a large amount of data (for example, music, images, and Operating Systems (OSs)) while being connected to, for example, personal computers (PCs). These mobile terminals are configured to use the minimum necessary connectors in order to realize a stylish design.

Here, the shape of a connector used for connecting a cable used for charging and communication of a large amount of data (for example, an OS update) between the PC and the mobile terminal is relatively greater with respect to the shape of the mobile terminal. If the connecter can be omitted, a mobile terminal with a more stylish design can be expected.

Further, it is possible to omit the connector for connection between the mobile terminal and the PC, by using non-contact charging instead of charging using a cable, with respect to the charging. For example, many devices using the Qi standard of wireless power supply developed by the Wireless Power Consortium (WPC) have been commercialized.

Meanwhile, wireless communication using a 60 GHz band is used with respect to communication of a large amount of data, and thus communication of data over 1 Giga bit per second (Gbps) is possible. The communication standard of the 60 GHz band is developed by The Institute of Electrical and Electronics Engineers, Inc. (IEEE) 802.11ad, and commercialization is promoted by the Wireless Gigabit (WiGig) alliance.

IEEE 802.11ad assumes peer-to-peer communication in a short distance within several meters (m). Therefore, in the IEEE 802.11ad, a decrease in reliability occurring in a wireless Local Area Network (LAN), for example, a decrease in a transmission rate caused by connection of a plurality of mobile terminals or communication interference caused by a mobile terminal using another communication standard, is unlikely to occur, and reliability is high for communication of a large amount of data.

FIG. 16 is a diagram illustrating an example of a configuration of non-contact charging in the related art using a mobile terminal 101 and, for example, a terminal of a touch pad shape (hereinafter, referred to as a "pad terminal"). The pad terminal 102 is connected to a PC 103 or a backhaul through a cable. In FIG. 16, after the mobile terminal 101 is placed on a surface of the pad terminal 102, power is transmitted from a charging circuit 1125 (see a hatched part illustrated in FIG. 16) in the pad terminal 102 to a charging circuit 1115 (see a hatched part illustrated in FIG. 16) in the mobile terminal 101, and the mobile terminal 101 is charged in a non-contact manner.

FIG. 17 is a diagram illustrating an example of a configuration of non-contact charging in the related art using mobile terminals 50A, 50B, and 50C and a charging stand 20 (for example, see Patent Literature 1). After the plurality of mobile terminals 50A, 50B, and 50C are placed on a top plate 21, the charging stand detects the positions of the respective mobile terminals 50A, 50B, and 50C and moves respective power transmission coils 11 provided in the charging stand 20 along the top plate 21 by using a movement mechanism, not illustrated. The charging stand 20 moves the respective power transmission coils 11 close to power reception coils 51 of the respective mobile terminals 50, and performs non-contact charging after completion of an alignment between the respective power transmission coils 11 and the respective power reception coils 51.

FIG. 18 is a diagram illustrating an example of a configuration of non-contact charging in the related art using a pinless power jack 1100 and a pinless power plug 1200 (for example, see Patent Literature 2). The pinless power jack 1100 includes a primary induction coil 1120 coupled to a power source 1020 through a driving unit 1040, and a light receiver 3200. The pinless power plug 1200 includes a secondary induction coil 1220 coupled to an electric load 1400a, and a light transmitter 3100. The light transmitter 3100 and the light receiver 3200 are aligned on a central axis of the primary induction coil 1120, and data is transmitted and received by optical communication between the light transmitter 3100 and the light receiver 3200 through a shielding layer 1320. Further, power is transmitted and received by electromagnetic induction between the primary induction coil 1120 and the secondary induction coil 1220.

FIG. 19 is a front view of a spatial light transmission apparatus using light transmission in the related art (for example, see Patent Literature 3). The spatial light transmission apparatus includes a plurality of light projecting units 2 each in which a light projecting element is arranged behind a light projecting lens, and a plurality of light receiving units 3 each in which a light receiving element is arranged behind a light receiving lens. In the spatial light transmission apparatus, the light projecting units 2 and the light receiving units 3 are arranged while being distributed equally and alternately in vertical and horizontal directions on a plane, and thus a plurality of projecting light beams may be obtained as one thick light beam. Therefore, the spatial light transmission apparatus applies lights to the front of the spatial light transmission apparatus on the other side which is oppositely arranged, and thus it is possible to easily adjust the optical axes between both the spatial light transmission apparatuses.

CITATION LIST

Patent Literature

Patent Literature 1: JP-A-2010-288430
Patent Literature 2: JP-T-2010-517502
Patent Literature 3: JP-A-10-32276

SUMMARY OF INVENTION

Technical Problem

The present inventor discusses a wireless module and a wireless communication apparatus, which transmit and receive data by wireless communication. However, in Patent Literature 1, a wireless communication function has a configuration different from that of the movement mechanism for the transmission coil, and thus a separate alignment is needed in the wireless communication apparatus using the 60 GHz band.

Further, since optical communication is used for data communication in Patent Literature 2 and Patent Literature 3, if the respective optical axes of a transmission side and a reception side are shifted, it is difficult to communicate a large amount of data at a high speed in some cases.

In order to solve the problems in the related art described above, an object of the present disclosure is to provide a wireless module and a wireless communication apparatus which perform non-contact charging with the opposing apparatus and perform wireless communication at a high speed with the opposing apparatus by a simple configuration, without performing a highly accurate alignment with the opposing apparatus.

Solution to Problem

The present disclosure is a wireless module including: a non-contact charging unit, configured to transmit power to an opposing apparatus through a coil in a non-contact manner; and a wireless communication unit including a plurality of antennas, wherein the plurality of antennas are arranged at substantially regular intervals from a center of a central axis of the coil, and wherein the wireless communication unit transmits data from the respective antennas by wireless communication when the non-contact charging unit transmits power to the opposing apparatus.

The present disclosure is a wireless communication apparatus including a wireless module that includes: a non-contact charging unit, configured to transmit power to an opposing apparatus through a coil in a non-contact manner; and a wireless communication unit including a plurality of antennas, wherein the plurality of antennas are arranged at substantially regular intervals from a center of a central axis of the coil, and wherein the wireless communication unit transmits data from the respective antennas by wireless communication when the non-contact charging unit transmits power to the opposing apparatus.

Advantageous Effects of Invention

According to the present disclosure, since a function of non-contact charging and a function of high speed wireless communication are integrated, it is possible to simultaneously process an alignment of the non-contact charging and an alignment of the high speed wireless communication, and perform wireless communication at a high speed with an opposing apparatus, without separately performing a highly accurate alignment with the opposing apparatus.

BRIEF DESCRIPTION OF DRAWINGS

In FIG. 3, (A) is a diagram illustrating positions of the central axes of the respective coils and the respective antenna elements, and (B) is a graph illustrating a relationship between distances from the central axes of the respective coils and the strength of a magnetic field.

DESCRIPTION OF EMBODIMENTS

Background of Respective Embodiments

First, before describing respective embodiments of a wireless module and a wireless communication apparatus according to the present disclosure, problems in non-contact charging and wireless communication between a mobile terminal and a pad terminal in the related art will be described as a background of the respective embodiments.

In the non-contact charging and the wireless communication between the mobile terminal and the pad terminal, the suppression of deterioration in the performance of the non-contact charging and the wireless communication due to a change in a position and a direction of the mobile terminal is required.

Figure 16:
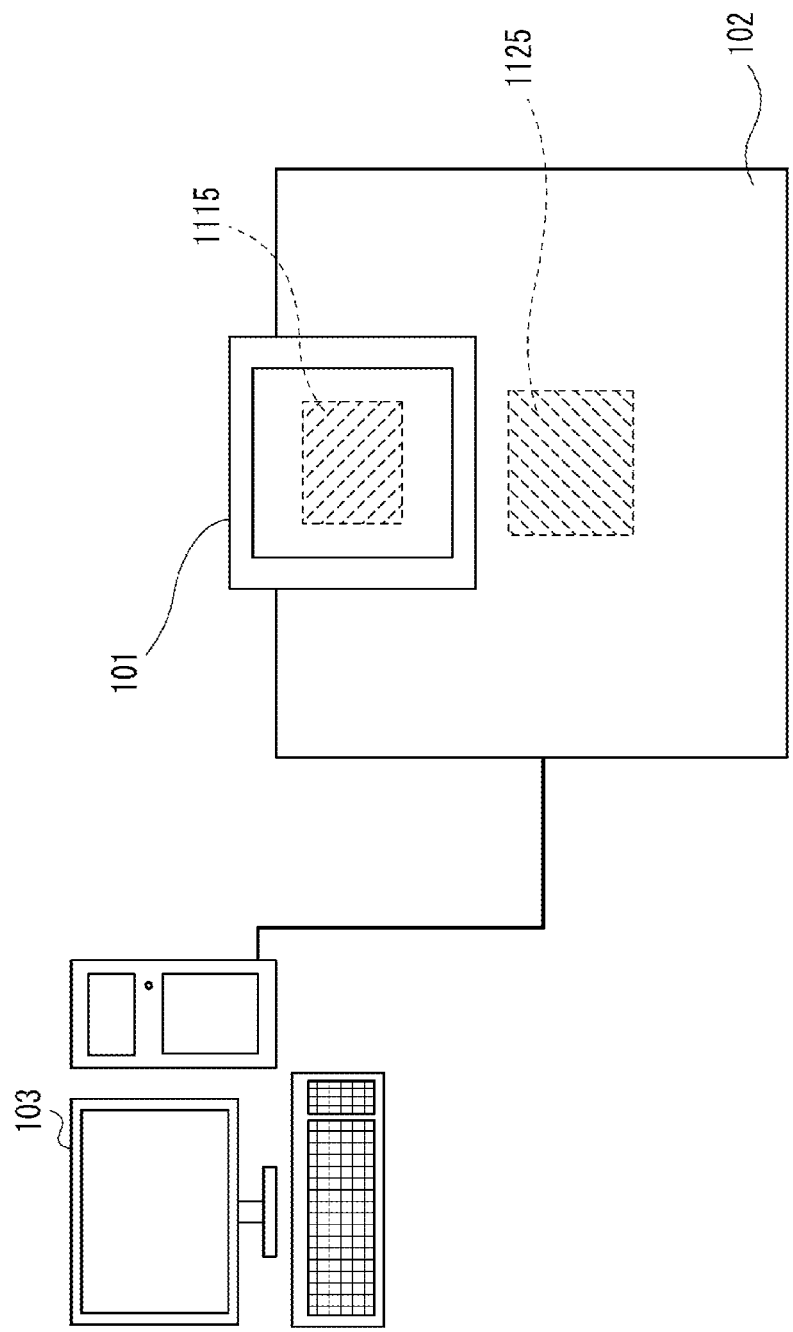
FIG. 16 is a diagram illustrating an example of a configuration of non-contact charging in the related art using a mobile terminal and a pad terminal.

However, in FIG. 16, the alignment between the coil for non-contact charging provided in the mobile terminal and the coil for non-contact charging provided in the pad terminal, and also the accurate alignment between the antenna for wireless communication provided in the mobile terminal and the antenna for wireless communication provided in the pad terminal are needed.

Figure 17:
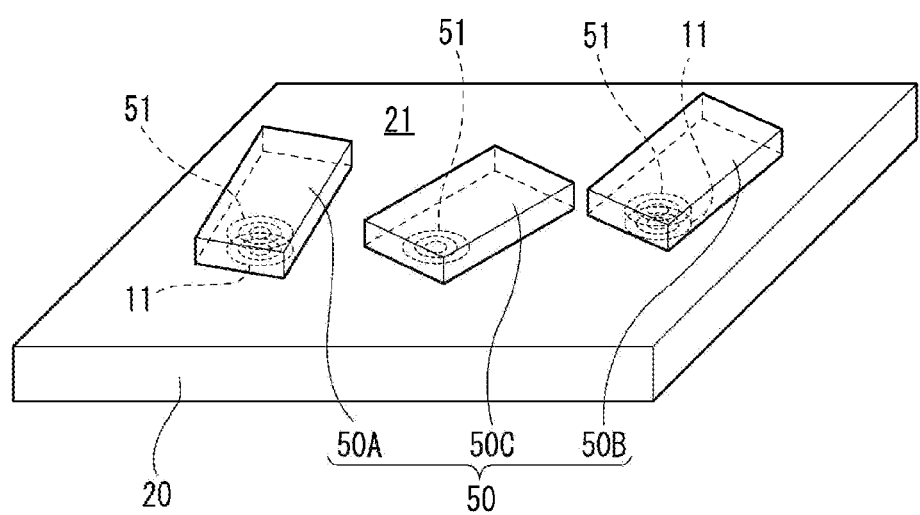
FIG. 17 is a diagram illustrating an example of a configuration of non-contact charging in the related art using mobile terminals and a charger.

Further, in FIG. 17, separate alignments of the respective antennas for wireless communication of the mobile terminal and the pad terminal are needed such that the mobile terminal and the pad terminal perform better wireless communication.

Figure 18:
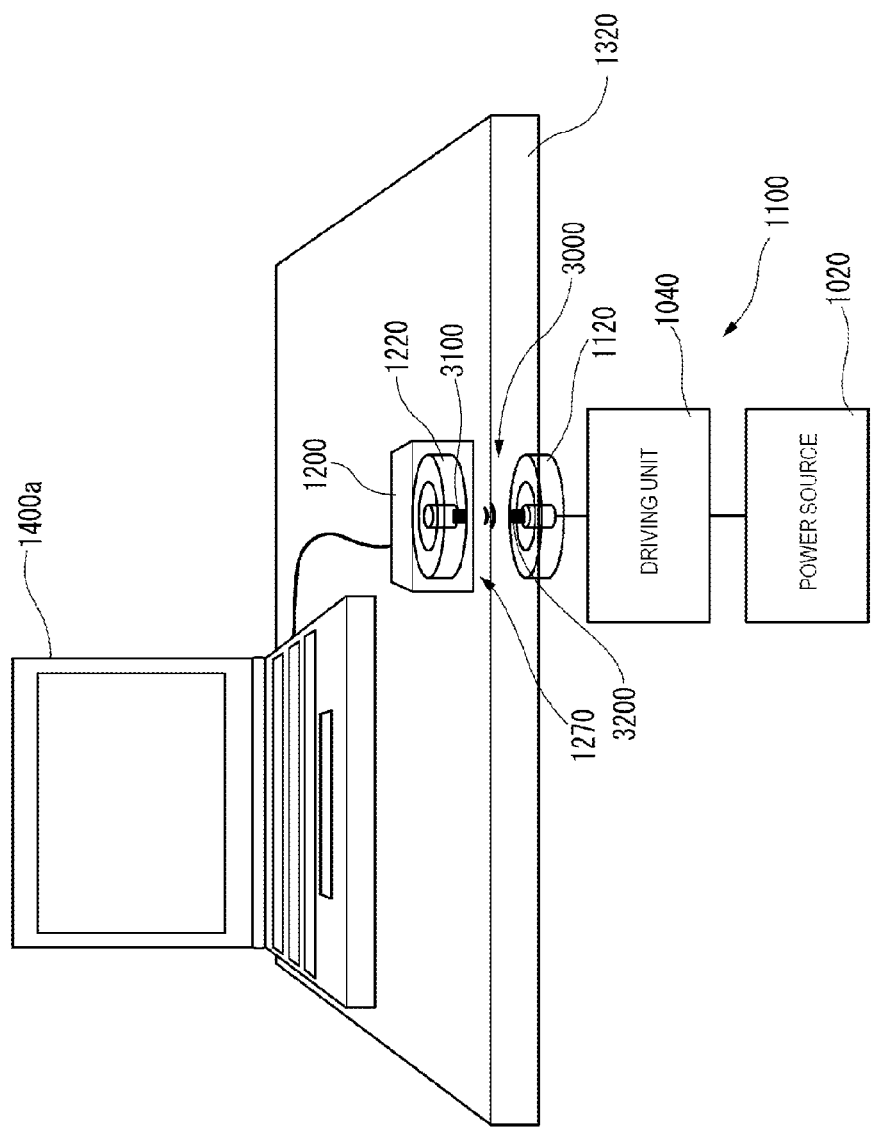
FIG. 18 is a diagram illustrating an example of a configuration of non-contact charging in the related art using a pinless power jack and a pinless power plug.

Further, in FIG. 18, a light emitting diode is used for a light transmitter, a photodiode is used for a light receiver, and a module for communication is arranged on a central axis of a circular coil for non-contact charging. However, since light has a strong directivity, when the alignment of the primary induction coil and the secondary induction coil and the alignment of the light emitting diode and the photodiode are not performed very accurately, data communication becomes difficult.

Figure 19:
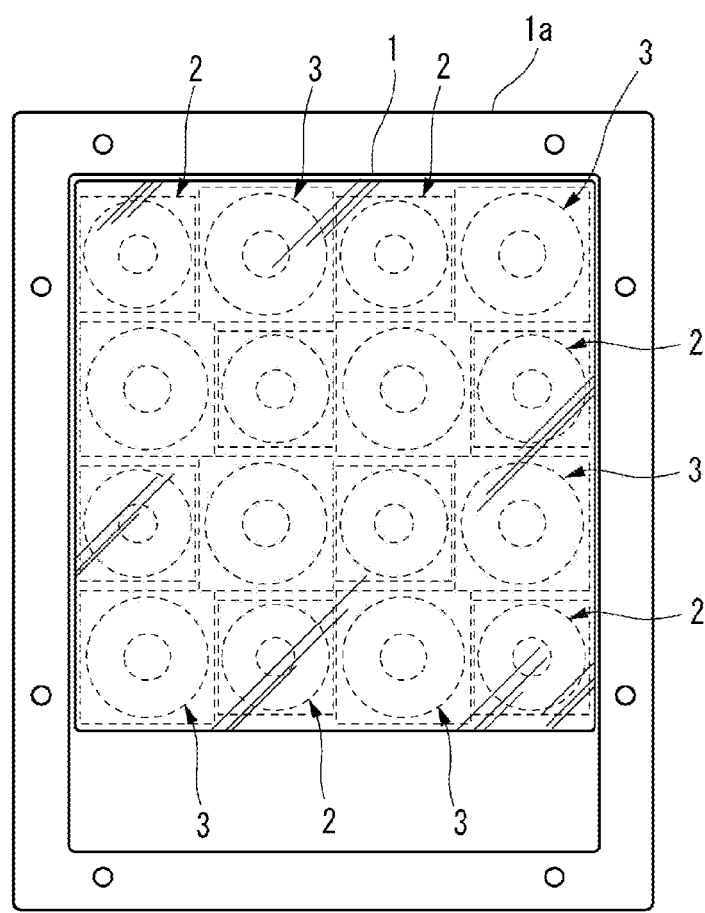
FIG. 19 is a front view of a spatial light transmission apparatus using light transmission in the related art.

Furthermore, in FIG. 19, in order to easily adjust the optical axes between two spatial light transmission apparatuses arranged to face, it is necessary to provide a large number of the light projection units or a large number of the light receiving units in the inner part of the coil for non-contact charging. Therefore, a charging efficiency between the two spatial light transmission apparatuses arranged to face deteriorates, and there is a possibility that the consumption power increases in order to establish communication while making the width of a beam thicker.

Thus, in the following respective embodiments, examples of a wireless module and a wireless communication apparatus which perform the non-contact charging with opposing apparatus so as to perform wireless communication at a high speed with an opposing apparatus by a simple configuration, without performing a highly accurate alignment with opposing apparatus.

Description Regarding Respective Embodiments

Hereinafter, respective embodiments of the wireless module and the wireless communication apparatus according to the present disclosure will be described with reference to drawings. The wireless module of each embodiment is provided in the inside of the pad terminal which transmits power to the mobile terminal or the mobile terminal which receives power transmitted from the pad terminal, in the non-contact charging between the mobile terminal and the pad terminal. Further, the wireless module of each embodiment transmits or receives data by wireless communication with the wireless module provided in the inside of the opposing apparatus (for example, the mobile terminal or the pad terminal).

Further, the wireless communication apparatus (for example, the mobile terminal) according to the present disclosure includes the wireless module of each embodiment, receives power transmitted from the opposing apparatus (for example, the pad terminal) in the non-contact charging, and transmits or receives data by wireless communication with the opposing apparatus. In addition, the wireless communication apparatus (for example, the mobile terminal) may transmit power to the opposing apparatus (for example, the pad terminal) in the non-contact charging.

First Embodiment

Figure 1:
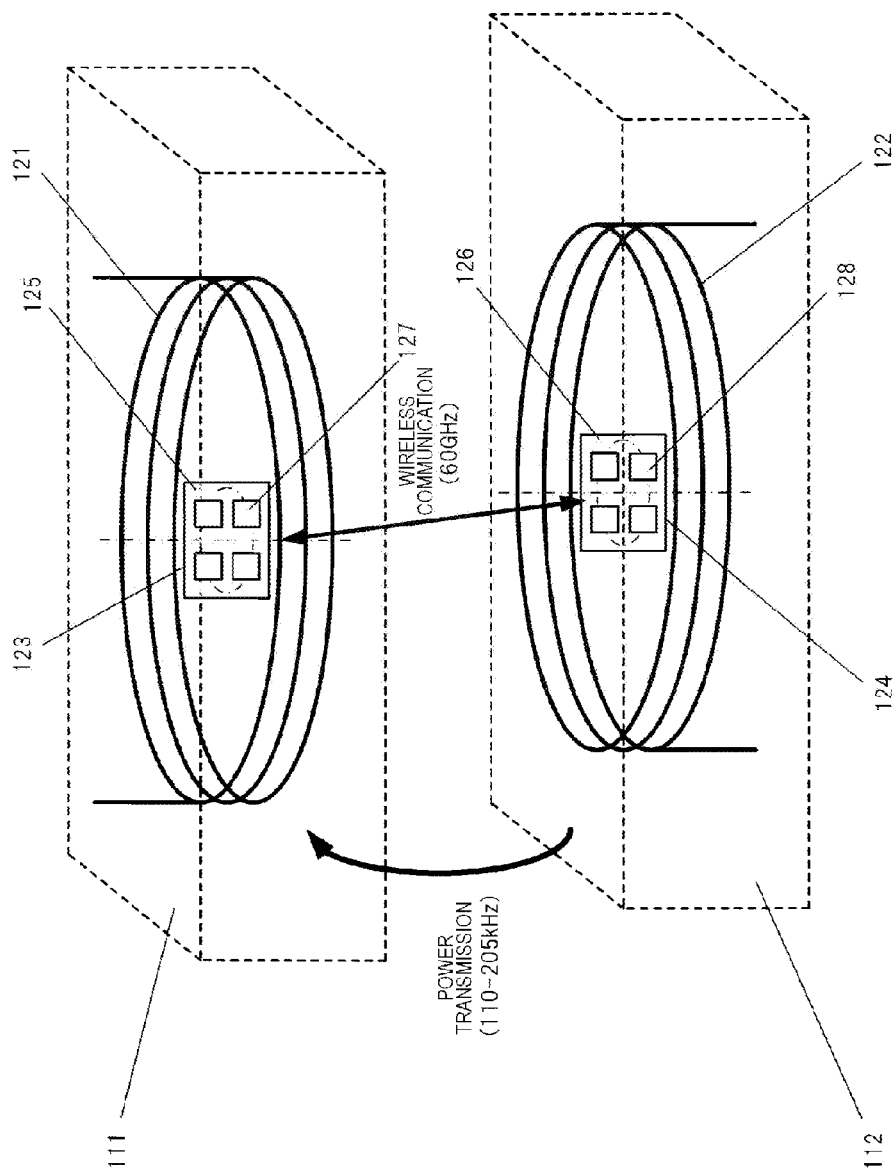
FIG. 1 is a diagram illustrating an example in which two wireless modules arranged to face perform non-contact charging and wireless communication with each other.
Figure 2:
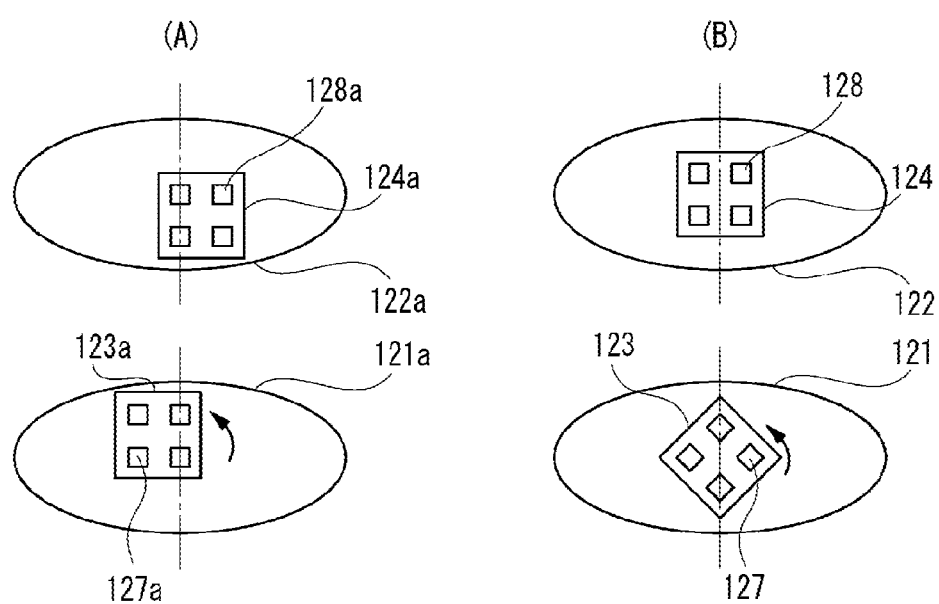
FIG. 2 illustrates positional relationships between a coil and each antenna element in a multi-antenna communication module, when a mobile terminal is rotated: (A) illustrates a case where an alignment between the antenna elements is shifted; and (B) illustrates a case where the alignment between the antenna elements is not shifted.

FIG. 1 is a diagram illustrating an example in which two wireless modules 111 and 112, which are arranged to face, perform the non-contact charging and the wireless communication with each other. FIG. 2 is a diagram illustrating a positional relationship between coils and respective antenna elements in a multi-antenna communication module when a mobile terminal is rotated. FIG. 2(A) illustrates a case where alignment between the antenna elements is shifted. FIG. 2(B) illustrates a case where alignment between the antenna elements is not shifted.

The wireless module 111 is provided in, for example, the mobile terminal (for example, a smartphone, hereinafter, the same). The wireless module 112 is provided in the pad terminal which transmits power to the mobile terminal by the non-contact charging.

The wireless module 111 includes a coil 121 for non-contact charging and a multi-antenna communication module 123 including a plurality of (for example, four) antenna elements 127 arranged on a substrate 125.

The wireless module 112 includes a coil 122 for non-contact charging and a multi-antenna communication module 124 including a plurality of (for example, four) antenna elements 128 arranged on a substrate 126.

In the respective embodiments including the present embodiment, the wireless module 111 and the wireless module 112 transmit power using a frequency band up to, for example, 110 to 205 kHz, and perform wireless communication using a frequency band of, for example, 60 GHz. Hereinafter, for simplicity of description, an example will be described in which the wireless module 112 transmits power to the wireless module 111 and the wireless module 111 receives power transmitted from the wireless module 112, in the non-contact charging.

In the multi-antenna communication module 123, the plurality of antenna elements 127 are arranged at regular intervals or substantially regular intervals, concentrically around the central axis of the coil 121 on the substrate 125.

In the multi-antenna communication module 124, the plurality of antenna elements 128 are arranged at regular intervals or substantially regular intervals, concentrically around the central axis of the coil 122 on the substrate 126.

Here, FIG. 2(A) illustrates a case where the respective multi-antenna communication modules 123a and 124a are not arranged around the centers of the central axes of the respective coils 121 and 122. In FIG. 2(A), since the antenna elements 127a and 128a on the respective multi-antenna communication modules 123a and 124a are not arranged concentrically around the central axes of the coils 121 and 122, when the wireless modules 111 and 112 are rotated, the alignments of the respective antenna elements 127a and 128a are shifted.

In other words, even if the respective coils 121a and 122a of the respective wireless modules 111a and 112a are correctly aligned, thereafter, when the coils 121a and 122a are rotated, the alignments of the respective antenna elements 127a and 128a of the respective multi-antenna communication modules 123a and 124a are shifted. As a result, communication speed between the wireless modules 111a and 112a is reduced.

In FIG. 2(B), the respective antenna elements 127 and 128 are arranged concentrically around the central axes of the coils 121 and 122. Therefore, even if the respective coils 121 and 122 of the wireless modules 111 and 112 are rotated, the distances from the central axes of the respective coils 121 and 122 to the respective antenna elements 127 and 128 are the same or substantially the same, and thus a decrease in the communication speed between the wireless modules 111 and 112 can be suppressed.

FIG. 3(A) is a diagram illustrating positions of the central axes of the respective coils 121 and 122 and the respective antenna elements 127 and 128. FIG. 3(B) is a graph illustrating a relationship between distances from the central axes of the respective coils 121 and 122 and the strength of a magnetic field. If the respective multi-antenna communication modules 123 and 124 are arranged in the vicinities of the central axes of the respective coils 121 and 122, an interference between the transmission power in the non-contact charging which uses a magnetic flux as a medium and the transmission signal in wireless communication is reduced.

In other words, according to Biot-Savart law (see Equation 1), the values of the distances x from the central axes of the respective coils 121 and 122 illustrated in FIG. 3(A) are small, that is, as the respective antenna elements 127 and 128 of the multi-antenna communication modules 123 and 124 are arranged in the vicinities of the central axes of the respective coils 121 and 122, the strength of the magnetic field is reduced (see FIG. 3(B)).

The horizontal axis of FIG. 3(B) represents the ratio of the distances x from the central axes of the respective coils 121 and 122 to the radii R of the respective coils 121 and 122, and the vertical axis of FIG. 3(B) represents the strength H of the magnetic field calculated by Equation (1). In addition, for simplicity of description, FIG. 3(A) describes one antenna element among the plurality of antenna elements 127.

[Equation 1]

$$H = \frac{I}{4\pi R} \int_0^{2\pi} \frac{1 - x/R \cdot \cos\theta}{(1 - 2 \cdot x/R + x^2/R^2)^{3/2}} \cdot d\theta \quad (1)$$

In the respective embodiments including the present embodiment, since the multi-antenna communication modules 123 and 124 are arranged in the vicinities of the central axes of the respective coils 121 and 122, an interference between the transmission power in the non-contact charging and the transmission signal in wireless communication is reduced in the wireless modules 111 and 112.

Figure 4:
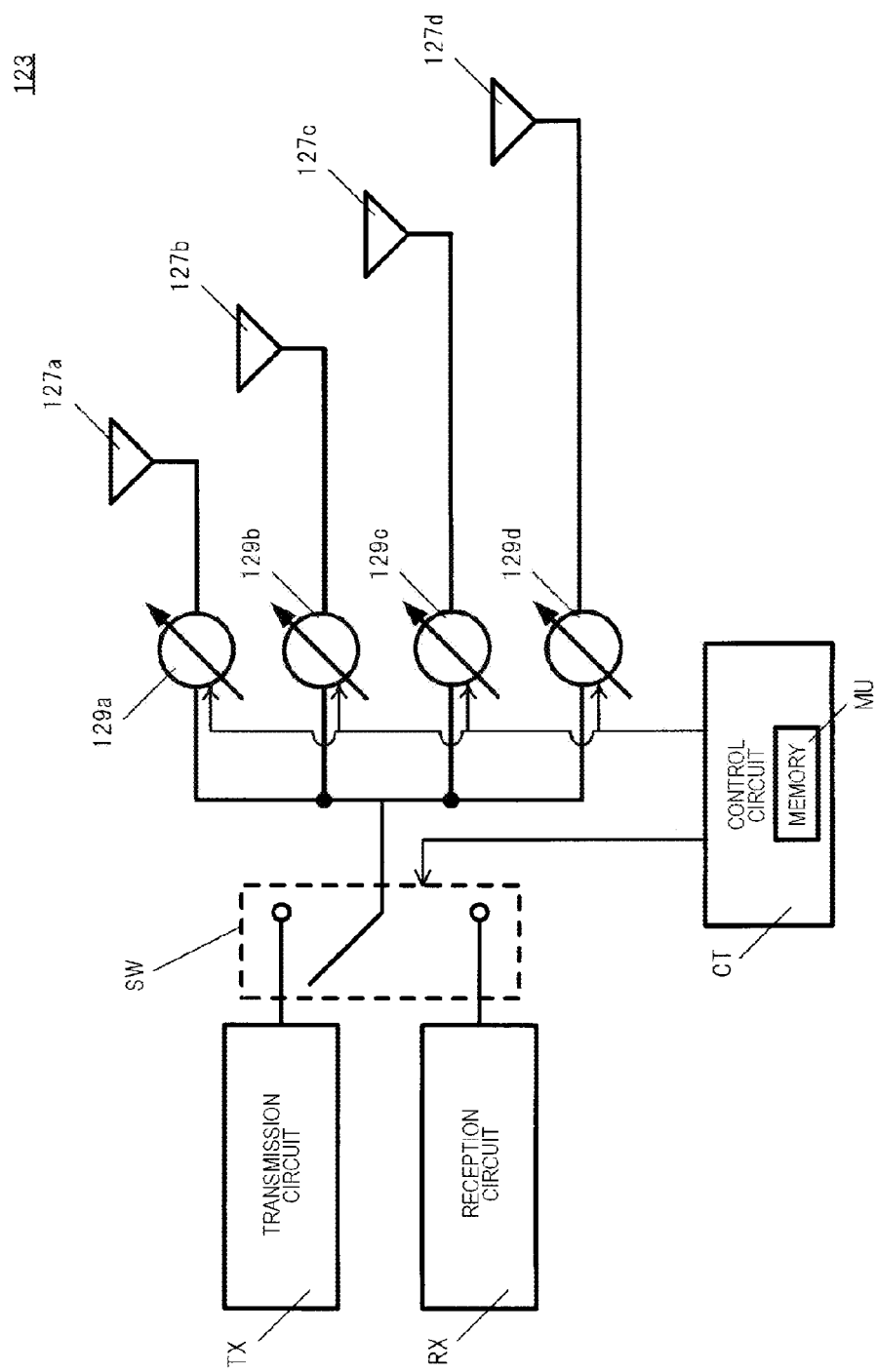
FIG. 4 is a block diagram illustrating an internal configuration of the multi-antenna communication module.

FIG. 4 is a block diagram illustrating an internal configuration of the multi-antenna communication module 123. The multi-antenna communication module 123 as a wireless communication unit includes a transmission circuit TX, a reception circuit RX, a control circuit CT, a switch SW, a plurality of (for example, four) antenna elements 127*a*, 127*b*, 127*c*, and 127*d*, and phase shifters 129*a*, 129*b*, 129*c*, and 129*d* of the same number as that of the antenna elements.

Although FIG. 4 illustrates for example, multi-antenna communication module 123 of the wireless module 111 provided in the inside of the mobile terminal, the multi-antenna communication module 124 has the same configuration as that of the multi-antenna communication module 123, and thus the description of the multi-antenna communication module 124 will be omitted.

The transmission circuit TX generates data to be transmitted by the mobile terminal in response to, for example, an input operation of a user, and outputs a transmission signal of a high frequency (for example, 60 GHz band) according to a predetermined modulation scheme. The transmission signal is input to the phase shifters 129*a*, 129*b*, 129*c*, and 129*d* through the switch SW.

The reception circuit RX receives the reception signals that the antenna elements 127*a*, 127*b*, 127*c*, and 127*d* receive, through the phase shifters 129*a*, 129*b*, 129*c*, and 129*d*, and demodulates the reception signal according to a predetermined demodulation scheme.

The control circuit CT includes a memory MU, and outputs a control signal for causing the switch SW to be conductive or non-conductive, to the switch SW. The memory MU stores data of shift amounts of the central axes of the respective coils 121 and 122 in association with data of delay amounts of different phases to be given to the transmission signal which is generated by the transmission circuit TX or data of the delay amounts of different phases to be given to the reception signals which are received by the respective antenna elements.

In the respective embodiments including the present embodiment, the respective phase shifters give the delay amounts of different phases to the reception signals which are received by the respective antenna elements, according to the control signal which is an output of the control circuit CT, and thus the multi-antenna communication modules 123 and 124 form the directivity in the direction opposite to the direction of the beam of the transmission signal.

The data is measured by an actual measurement or a simulation in advance in which the shift amounts of the central axes of the respective coils 121 and 122 are associated with the data of the delay amounts of different phases to be given to the transmission signal generated by the transmission circuit TX or to the reception signals received by the respective antenna elements.

In addition, the control circuit CT of the multi-antenna communication module 123 as a transmission side sweeps the direction of the beam of the transmission signal, for example, by a predetermined amount at a time in order from 90 degrees (direction to face the pad terminal) without using the data in the memory MU. The multi-antenna communication module 124 as a reception side sequentially replies with information regarding the signal of the maximum reception power among the power of the received signals, for example, time from the start of reception of the signal, or information regarding the number of the received signals if the received signal is intermittent, to the multi-antenna communication module 123 as the transmission side.

In this case, the multi-antenna communication module 124 as the reception side uses a modulation scheme with a low transmission rate, for example, Binary Phase Shift. Keying (BPSK), and sets the transmission direction as, for example, the direction perpendicular to the coil. Thus, even if the communication condition is bad, the multi-antenna communication module 123 as the transmission side can receive information.

The multi-antenna communication module 123 as the transmission side may determine the direction of a beam of the transmission signal in which the reception power of the received signal is a maximum in the multi-antenna communication module 124 as the reception side based on the replied information.

In this case, the control circuit of the multi-antenna communication module 124 as the reception side forms the directivity of the reception signal in the direction opposite to the beam of the reception signal among the reception signals of the reception signals.

The control circuit CT outputs a control signal for giving the delay amounts of different phases to the transmission signal generated by the transmission circuit TX or the reception signals received by the respective antenna elements 127a, 127b, 127c, and 127d, using data stored in the memory MU, to the respective phase shifters 129a, 129b, 129c, and 129d.

The switch SW causes the phase shifters 129a, 129b, 129c, and 129d and the transmission circuit TX to be conductive or non-conductive, or causes the phase shifters 129a, 129b, 129c, and 129d and the reception circuit RX to be conductive or non-conductive, according to the control signal which is the output of the control circuit CT.

The antenna element 127a transmits the transmission signal to which a delay amount of a predetermined phase is given by the phase shifter 129a, according to the control signal which is the output of the control circuit CT. The antenna element 127a receives the signal transmitted from the antenna element of the wireless module 112 provided in the inside of the pad terminal, and outputs the received signal to the phase shifter 129a. In addition, the operations of other antenna elements 127b, 127c, and 127d are the same as that of the antenna element 127a, and thus the description thereof will be omitted.

The phase shifter 129a gives a delay amount of a predetermined phase to the transmission signal which is generated by the transmission circuit TX or the reception signal which is received by the antenna element 127, according to the control signal which is the output of the control circuit CT. In addition, the operations of other phase shifters 129b, 129c, and 129d are the same as that of the phase shifter 129a, and thus the description thereof will be omitted, however the delay amounts of a phase given by the respective phase shifters 129a, 129b, 129c, and 129d are different.

Figure 5:
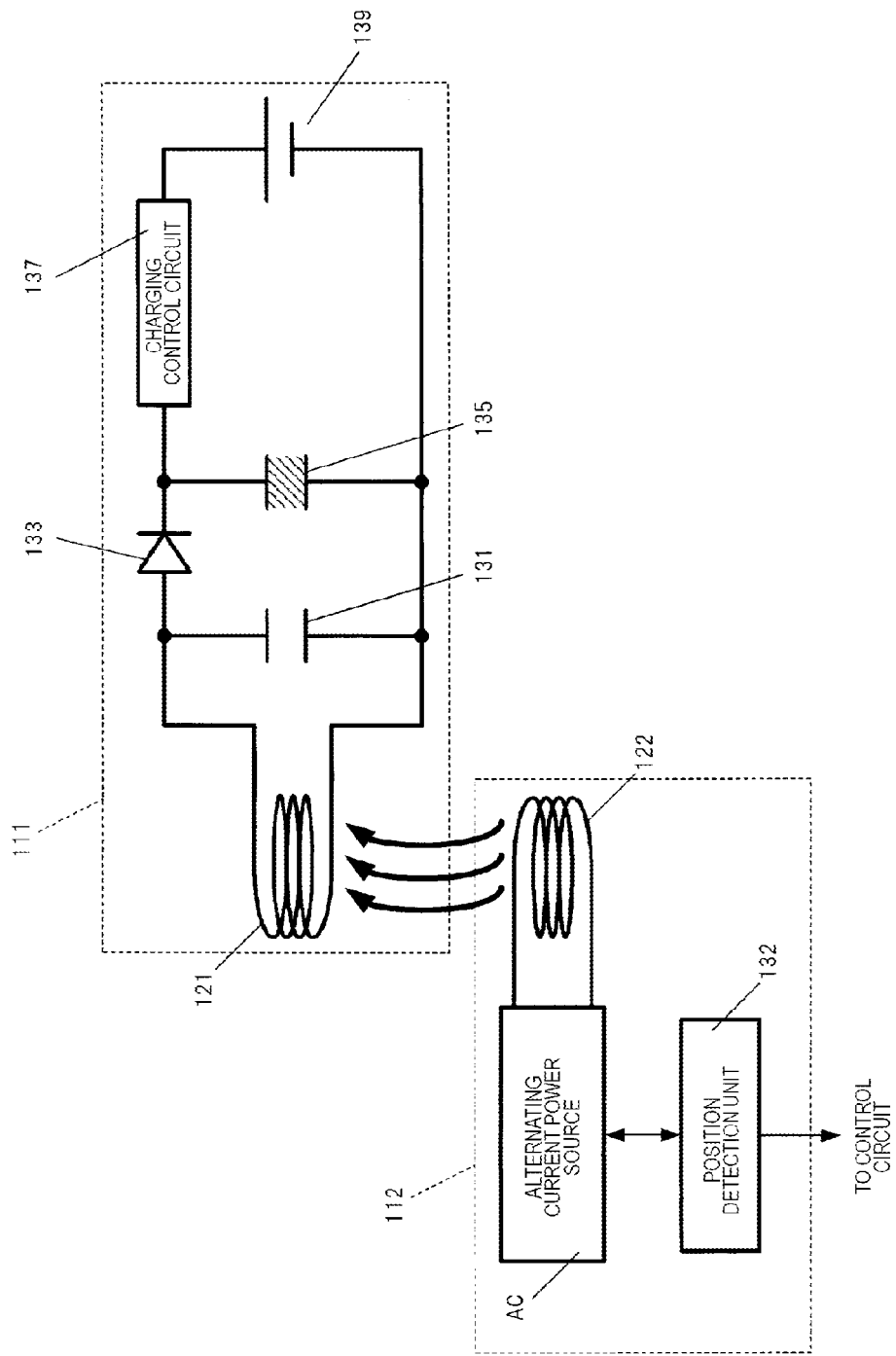
FIG. 5 is a diagram illustrating a configuration of non-contact charging between two wireless modules arranged to face.

FIG. 5 is a diagram illustrating a configuration of non-contact charging between two wireless modules 111 and 112 arranged to face. For simplicity of description of the non-contact charging illustrated in FIG. 5, an example will be described in which the wireless module 112 transmits power to the wireless module 111 and the wireless module 111 receives power transmitted from the wireless module 112.

Therefore, the wireless module 111 illustrated in FIG. 5 includes a coil 121, a capacitor 131, a rectifying diode 133, a smoothing capacitor 135, a charging control circuit 137, and a battery 139, as a non-contact charging unit. The wireless module 112 illustrated in FIG. 5 includes a coil 122, an alternating current (AC) power source AC, and a position detection unit 132, as a non-contact charging unit.

However, the wireless module 111 may further include an AC power source and a position detection unit, which are not shown, as the non-contact charging unit, and transmit power to the wireless module 112 in the non-contact charging. In addition, the wireless module 112 may further include a capacitor, a rectifying diode, a smoothing capacitor, a charging control circuit, and a battery, which are not shown, as the non-contact charging unit, and may receive power transmitted from the wireless module 111 in the non-contact charging.

In the wireless module 112 illustrated in FIG. 5, the coil 122 is wound in a spiral shape on a plane parallel to a surface (not shown) of a pad terminal in which the wireless module 112 is provided, and transmits (emits) power (an alternating current magnetic flux) to the upside of FIG. 5, according to an excitation current which is output by the AC power source AC.

In addition, the coil 122 is wound along the core of a magnetic material, and thus it is possible to improve an inductance. The core is a magnetic material (for example, a ferrite) with a high permeability, and has a shape, for example, of a donut. However, the coil 122 does not necessarily need to be wound along the core, but may be an air-core coil.

The AC power source AC is connected to the coil 122 through, for example, a flexible lead wire, and outputs an excitation current of a high frequency band of, for example, 110 to 205 kHz to the coil 122. In addition, the AC power source AC includes a self-excited oscillation circuit, and a power amplifier that amplifies an alternating signal which is output by the self-excited oscillation circuit (not shown). The self-excited oscillation circuit uses the coil 122 as a coil for oscillation, and the oscillation frequency changes due to the inductance of the coil 122.

The mutual inductance between the coil 122 of the wireless module 112 and the coil 121 of the wireless module 111 changes depending on the relative position of the coil 122 to the coil 121. Therefore, the inductance of the coil 122 changes depending on the relative position of the coil 122 to the coil 121. In other words, the oscillation frequency of the self-excited oscillation circuit of the AC power source AC changes depending on whether the coil 122 is close to the coil 121 or the coil 122 is separated from the coil 121.

The position detection unit 132 detects the relative position of the coil 122 to the coil 121, depending on the change in the oscillation frequency in the self-excited oscillation circuit of the AC power source AC. The position detection unit 132 sends data of the detected value of the relative position of the coil 122 to the coil 121 (the shift amounts of the central axes of the respective coils 121 and 122) to the control circuit CT of the multi-antenna communication module 124 of the wireless module 112.

In the wireless module 111 illustrated in FIG. 5, the coil 121 and the capacitor 131 form a parallel resonant circuit. The resonant frequency of the coil 121 and the capacitor 131 is same as or similar to the frequency (for example, 110 to 205 kHz) of a signal waveform of an AC signal which is output by the AC power source AC. The coil 121 is wound in a spiral shape on a plane parallel to a surface (not shown) of a mobile terminal in which the wireless module 111 is provided, and receives power (an alternating current magnetic flux) transmitted from the coil 122.

The rectifying diode 133 rectifies the AC power which is received by the coil 121. The smoothing capacitor 135 smoothes the pulsating flow of the power rectified by the rectifying diode 133. The charging control circuit 137 charges the battery 139 by using the DC power which is smoothed by the smoothing capacitor 135.

Here, as compared to the accuracy of the alignment of the coil for non-contact charging, the configuration of the present embodiment requires a highly accurate alignment of the antenna for wireless communication. That is because the size of the antenna for wireless communication is small as compared to the size of the coil for non-contact charging, and the frequency used in high speed communication is increased as compared to the frequency used in the non-contact charging.

Further, in Patent Literature 2, since the light emitting diode is used as the light transmitter and the photodiode is used as the light receiver, if the coil for the non-contact charging is not very accurately aligned, communication speed significantly deteriorates.

Furthermore, in Patent Literature 3, although the alignment is facilitated by respectively placing the light transmitter and the light receiver on one side, if Patent Literature 3 is applied to the present embodiment, the distance between the antenna for wireless communication and the coil for non-contact charging becomes close, and the communication speed deteriorates by the interference of the antenna for wireless communication and the coil for non-contact charging.

In contrast, in the present embodiment, the alignment by beamforming is performed by using a plurality of antennas (a plurality of antenna elements) after the alignment of coil for the non-contact charging, and thus both the non-contact charging and the high speed communication are intended.

Figure 6:
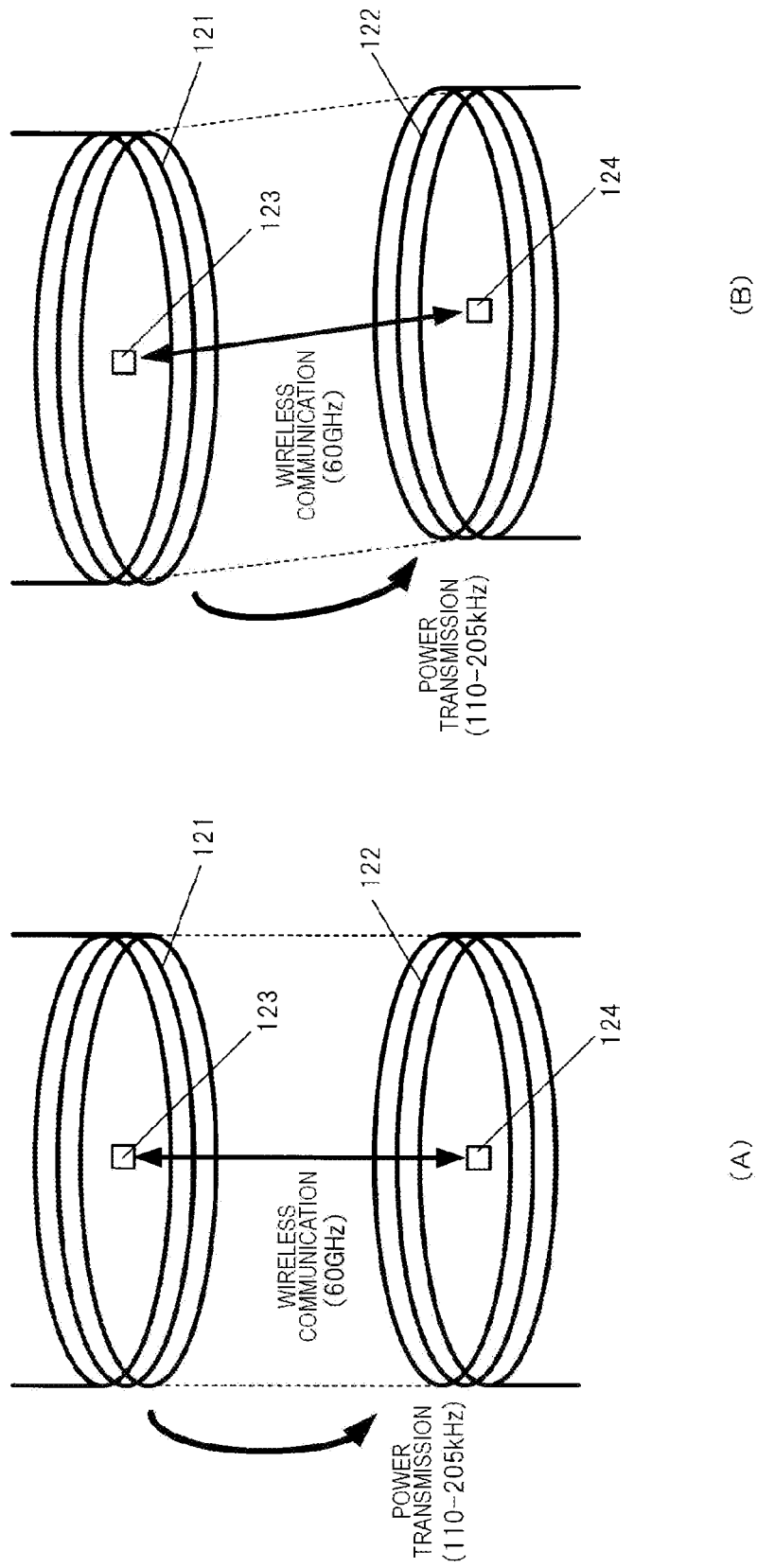
In FIG. 6, (A) is a diagram illustrating a state in which the respective central positions of the respective coils of the wireless module on a mobile terminal side and the wireless module on a pad terminal side are not shifted, and (B) is a diagram illustrating a state in which the respective central positions of the respective coils of the wireless module on the mobile terminal side and the wireless module on the pad terminal side are shifted.

The operations of the respective multi-antenna communication modules 123 and 124 will be described with reference to FIG. 6. FIG. 6(A) is a diagram illustrating a state (within an allowable range) in which the respective central positions of the respective coils 121 and 122 of the wireless module 111 on the mobile terminal side and the wireless module 112 on the pad terminal side are not shifted. FIG. 6(B) is a diagram illustrating a state (out of the allowable range) in which the respective central positions of the respective coils 121 and 122 of the wireless module 111 on the mobile terminal side and the wireless module 112 on the pad terminal side are shifted.

As a result the positions of the respective coils 121 and 122 are very accurately aligned, in a state in which the alignments of the respective coils 121 and 122 are not shifted or in a state within the allowable range (see FIG. 6(A)), the multi-antenna communication module 123 as the transmission side of the wireless communication generates a transmission signal, for example, of the same phase of 60 GHz band, and transmits the generated signal from the respective antenna elements 127a, 127b, 127c, and 127d.

Further, the multi-antenna communication module 124 as the reception side of the wireless communication synthesizes the respective reception signals, without giving the delay amount of the phase to the reception signals received by the respective antenna elements, in the phase shifter 129. In this case, in the multi-antenna communication modules 123 and 124, the alignment of the respective antenna elements is not shifted.

On the other hand, in a state in which the alignment of the respective coils 121 and 122 is shifted or is out of the allowable range (see FIG. 6(B)), the multi-antenna communication module 123 as the transmission side of the wireless module forms the directivity of the transmission signal, in the direction of beam of the transmission signal corresponding to the shift amounts of the central axes of the respective coils 121 and 122, that is, the detected value of the relative position of the coil 121 to the coil 122, based on data of the memory MU.

Further, the multi-antenna communication module 124 as the reception side of the wireless communication respectively gives the delay amounts of different phases corresponding to the shift amounts of the central axes of the respective coils 121 and 122, that is, the detected value of the relative position of the coil 121 to the coil 122, to the reception signals received by the respective antenna elements in the phase shifter 129, based on the data of the memory MU.

Otherwise, in a state in which the alignment of the respective coils 121 and 122 is shifted or is out of the allowable range (see FIG. 6(B)), the multi-antenna communication module 123 as the transmission side of the wireless module gives the delay amounts of different phases to the respective phase shifters 129a, 129b, 129c, and 129d, and thus sweeps the direction of the beam of the transmission signal from, for example, the 90 degrees (the direction facing the pad terminal) in order.

The multi-antenna communication module 124 as the reception side forms the directivity of the reception signal in the direction opposite to the direction of the beam of the signal received as maximum reception power, among the reception signals. The multi-antenna communication module 124 as the reception side transmits information regarding the directivity of the formed reception signal to the multi-antenna communication module 123 as the transmission side of the wireless communication.

In this case, the multi-antenna communication module 124 as the reception side uses a modulation scheme with a low transmission rate, for example, BPSK, and sets the transmission direction as, for example, the direction perpendicular to the coil. Thus, even in a case where the communication state is bad, the multi-antenna communication module 123 as the transmission side can receive information.

Further, the multi-antenna communication module 123 as the transmission side of the wireless communication obtains the direction opposite to the direction of the beam of the reception signal from information regarding the directivity of the reception signal received from the multi-antenna communication module 124 as the reception side, determines the obtained direction as the direction of the beam of the transmission signal, and forms the directivity of the transmission signal in the determined direction.

Accordingly, since the wireless modules 111 and 112 can transmit or receive power in non-contact charging and can form the respective beams of the transmission signal and the reception signal, which have directivities opposite to each other, by the beamforming in the wireless communication, it is possible to suppress quality deterioration in the wireless communication and to transmit and receive data. In other words, it is possible to prevent the quality deterioration in the wireless communication and maintain the quality in wireless communication in the wireless modules 111 and 112, even when the alignments of the central axes of the respective coils 121 and 122 are shifted.

Here, the greater the interval between the antenna elements of the wireless modules 111 and 112 is, the greater the effect of beamforming is. However, if the shift amounts of the central axes of the coils 121 and 122 are great, the efficiency of the non-contact charging is reduced. If one antenna element out of a plurality of antenna elements is arranged on the central axis of the coil (see FIG. 2(A)), a bias occurs in the formation of the beamforming.

Since the multi-antenna communication modules 123 and 124 are arranged as illustrated in FIG. 2(B) in the respective embodiments including the present embodiment, a plurality of antenna elements are arranged at regular intervals or substantially regular intervals on the central axis of the coil, and thus it is possible to suppress the bias of the formation of the beamforming.

Figure 7:
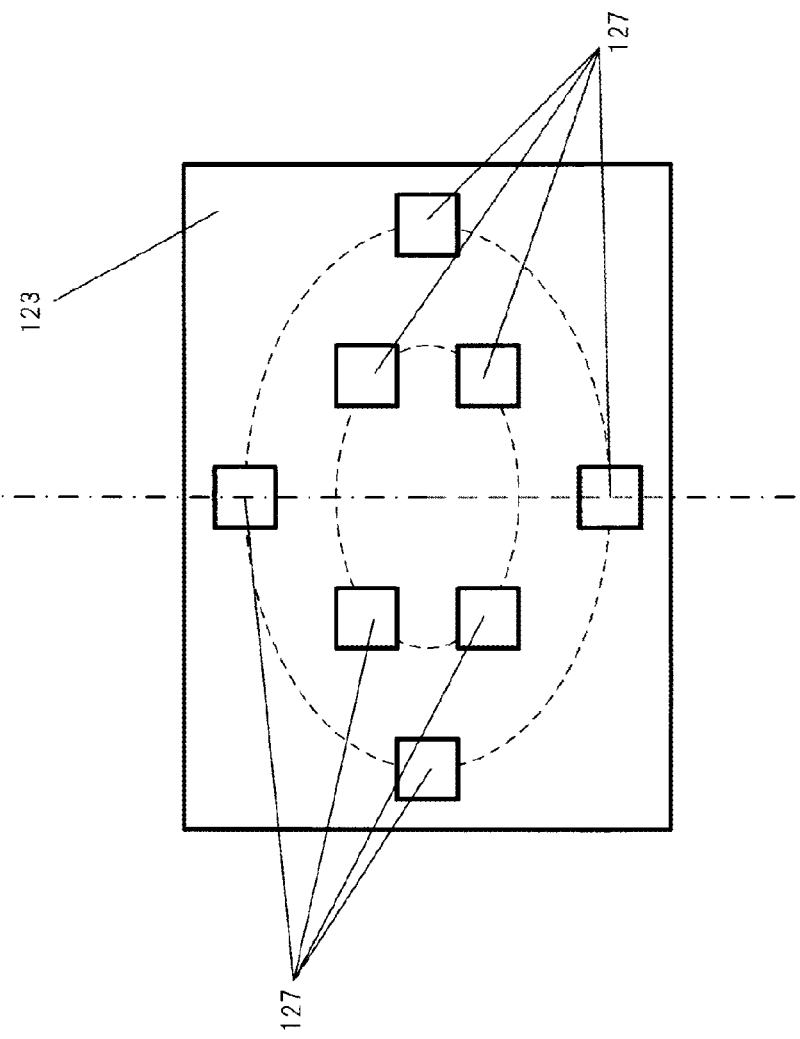
FIG. 7 is a diagram illustrating an aspect in which a plurality of antenna elements are arranged at regular intervals on a plurality of concentric circles, in the multi-antenna communication module.

Although the example has been described in which a plurality of antenna elements 127 and 128 are arranged at regular intervals or substantially regular intervals on one concentric circle around the central axis of the coils 121 and 122 in the multi-antenna communication modules 123 and 124 illustrated in FIG. 1, a plurality of antenna elements may be arranged at regular intervals or substantially regular intervals on a plurality of concentric circles (see FIG. 7). FIG. 7 is a diagram illustrating an aspect in which a plurality of antenna elements 127 are arranged at regular intervals on a plurality of concentric circles, in the multi-antenna communication module 123.

In addition, any method may be used as a method of alignment of the respective coils 121 and 122. For example, in a mobile terminal DEV and a pad terminal PAD of a magnet attraction type, the respective coils 121 and 122 are aligned so as to perform non-contact charging by the magnet provided in the inside of the mobile terminal DEV and the magnet provided in the inside of the pad terminal PAD attracting to each other (See FIG. 8(A)).

Figure 8:
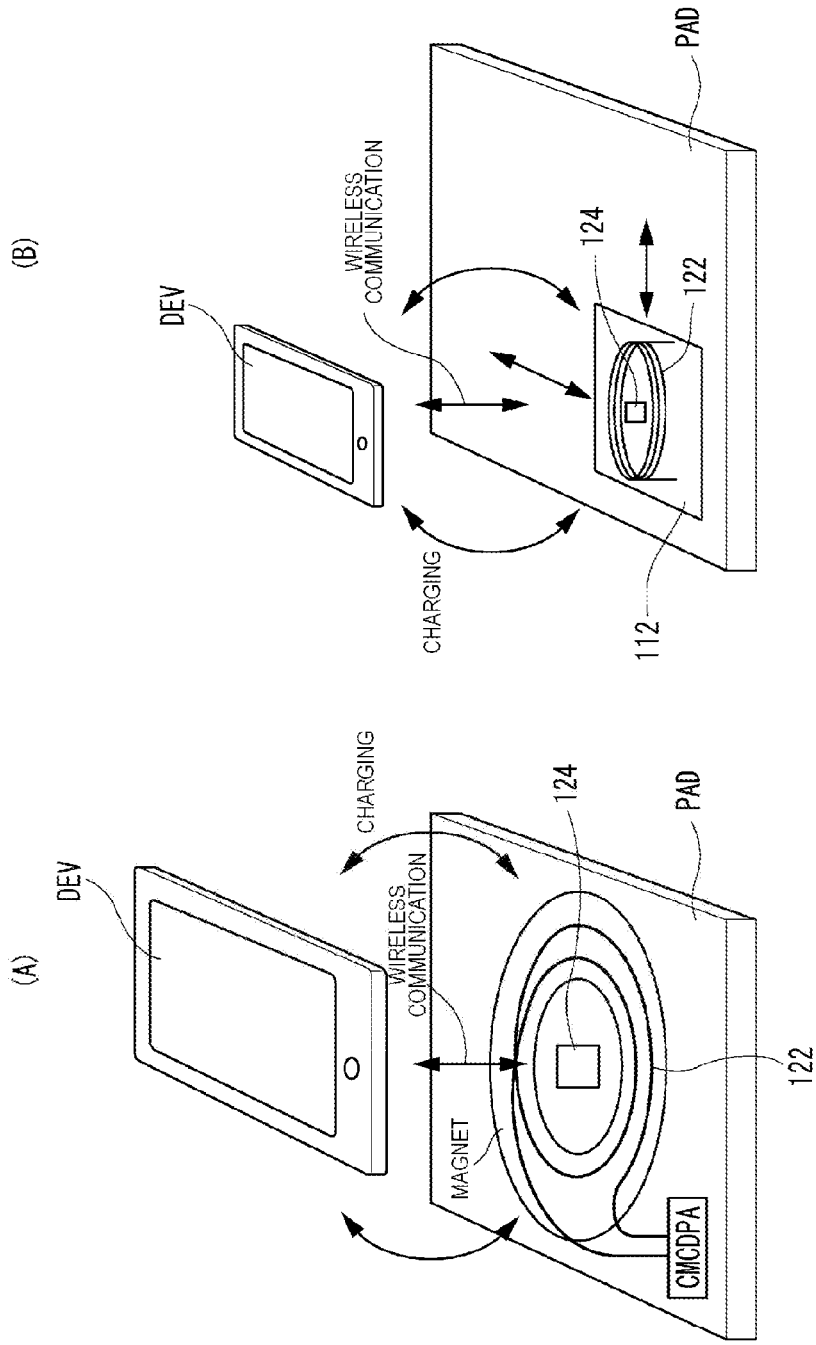
FIG. 8 is a diagram illustrating a method of alignment of the respective wireless modules of the mobile terminal and the pad terminal: (A) illustrates a case where a pad terminal of a magnet attraction type is used; and (B) illustrates a case where the pad terminal of a coil movable type is used.

FIG. 8(A) is a diagram illustrating an example of a method of alignment of the respective wireless modules of the mobile terminal DEV and the pad terminal PAD when the pad terminal PAD of the magnet attraction type is used.

In addition, similarly to Patent Literature 2, the pad terminal PAD may perform non-contact charging by detecting the position of the coil 121 provided in the inside of the mobile terminal DEV and by aligning the coil 121 and the coil 122 by the movement mechanism for the coil 122 (for example, a stepping motor) provided in the inside of the pad terminal PAD (see FIG. 8(B)).

FIG. 8(B) is a diagram illustrating an example of a method of alignment of the respective wireless modules of the mobile terminal DEV and the pad terminal PAD when the pad terminal of the coil movable type is used.

Second Embodiment

Figure 9:
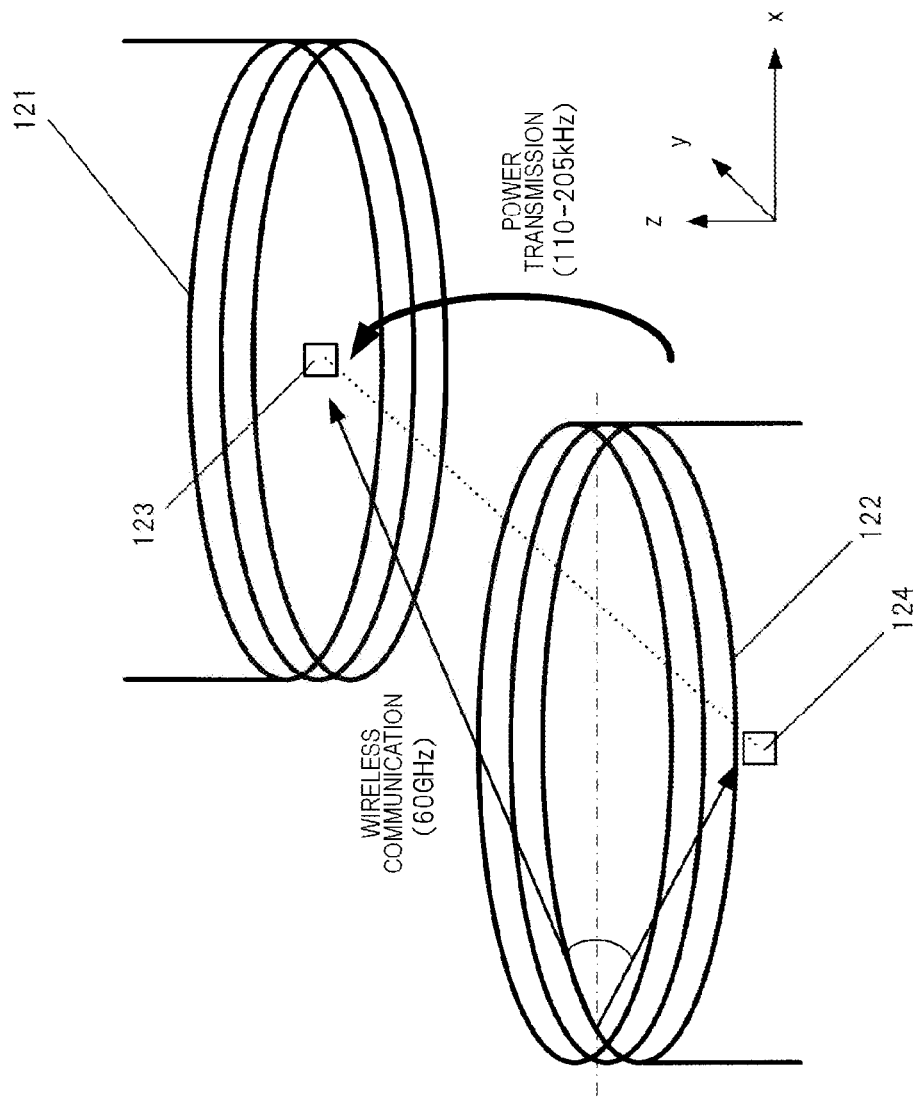
FIG. 9 is a diagram illustrating a state in which the respective multi-antenna communication modules of the mobile terminal and the pad terminal perform wireless communication using reflection of radio waves.
Figure 10:
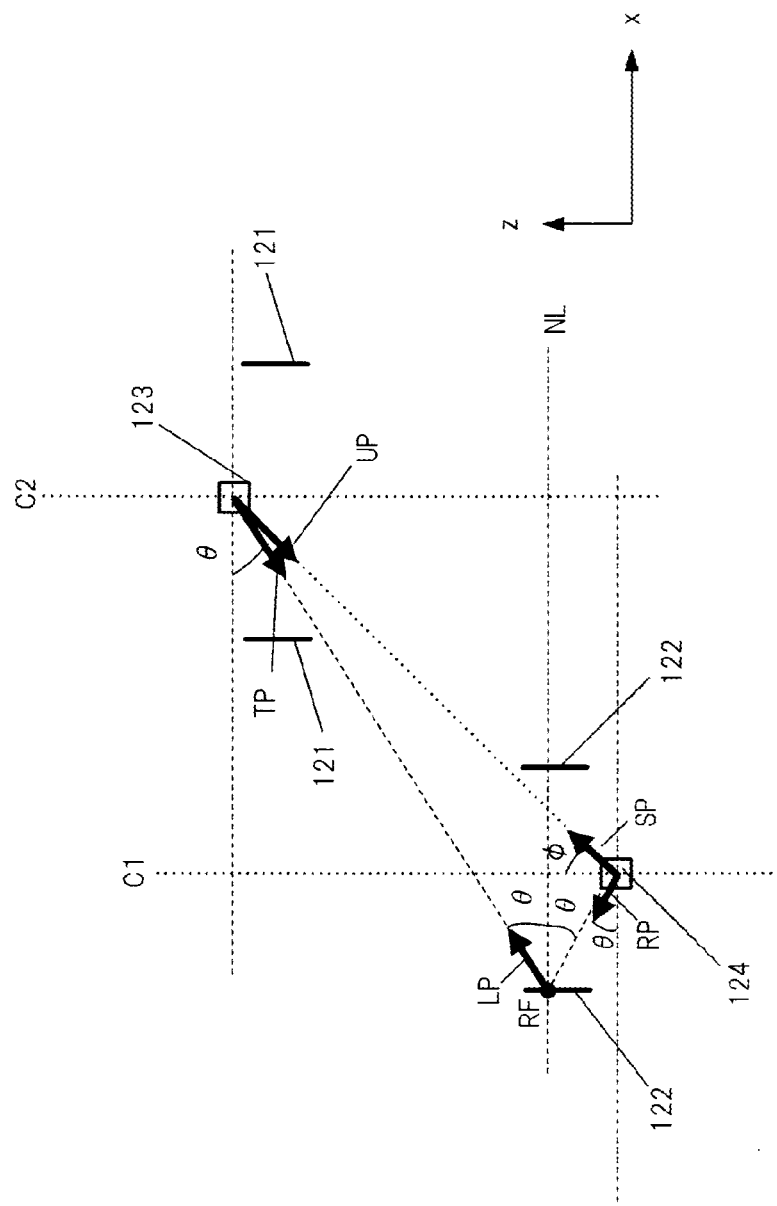
FIG. 10 is a top view of the respective multi-antenna communication modules which perform wireless communication using the reflection of radio waves.

FIG. 9 is a diagram illustrating a state in which the multi-antenna communication modules 123 and 124 of the mobile terminal and the pad terminal perform wireless communication using the reflection of radio waves. FIG. 10 is a top view of the respective multi-antenna communication modules 123 and 124 which perform wireless communication using the reflection of radio waves.

In the first embodiment, a method has been described in which when the alignments of the coils 121 and 122 are shifted, the multi-antenna communication modules 123 and 124 form respective beams, which have opposite directivities, of a transmission signal and a reception signal by beamforming so as to prevent quality deterioration in the wireless communication.

However, the quality in wireless communication deteriorates depending on the positions in a Z direction or the positions in a XY direction of the coils 121 and 122 and the multi-antenna communication modules 123 and 124 in some cases. In addition, even when an obstacle (for example, another coil) exists between two multi-antenna communication modules 123 and 124, the quality in wireless communication deteriorates in some cases.

Therefore, in the present embodiment, the multi-antenna communication module 124 as the transmission side of the wireless communication determines the direction of the beam of the transmission signal as the direction (see FIG. 10) (hereinafter, referred to as "direction of reflection") opposite to the direction (referred to as a "perspective direction") of the beam determined in the first embodiment across the central axis of the coil 122. Further, the multi-antenna communication module 124 forms the directivity of the beam of the transmission signal in the determined reflection direction RP, and reflects the radio waves to the coil 122 so as to transmit data. In addition, the coils 121 and 122 of FIG. 10 illustrate a cross-sectional view in a ZX plane.

Further, the multi-antenna communication module 123 as the reception side of the wireless communication determines the direction (see FIG. 10) opposite to the direction of the reflection angle with respect to the direction of an incidence angle for the reflection position of the coil 122 as the direction for forming the directivity of the reception signal. In addition, the multi-antenna communication module 123 forms the directivity of the reception signal received by the antenna element 128 in the determined direction.

Specifically, when the central axis C2 of the coil 121 and the central axis C1 of the coil 122 are shifted, for example, by a predetermined amount or more, the multi-antenna communication module 124 as the transmission side of the wireless communication forms the beam of the transmission signal, according to the shift amount φ, not in the perspective direction SP, but in the reflection direction RP. The transmission signal (radiated wave) which is the output of the multi-antenna communication module 124 is reflected on the reflection position RF on the coil 122 and transmitted in a direction LP of a reflection angle θ with respect to the direction RP of the incidence angle θ with respect to the normal line N. Further, the reflection position RF is adjusted in such a manner that the greater the shift amount φ is, the smaller the reflection angle θ is, while the smaller the shift amount φ is, the greater the reflection angle θ is.

The multi-antenna communication module 123 as the reception side of the wireless communication forms the directivity of the reception signal received by the antenna element 128 according to the shift amount φ, not in the direction UP opposite to the perspective direction SP, but in the direction TP opposite to the direction LP of the reflection angle at a reflection position RP on the coil 122. In other words, in FIG. 10, the directivity of the transmission beam is formed in the direction of an x-axis.

Similarly to the first embodiment, the determination method of the directions of the respective beams of the transmission signal and the reception signal in the multi-antenna communication modules 123 and 124 may use data of the memory MU when the angle according to the shift amount φ of the central axes C1 and C2 of the coils 121 and 122 is stored in the memory MU in advance, or may use the data of the phase when the reception power is at maximum. The details of the determination method of the directions of the respective beams of the transmission signal and the reception signal in the multi-antenna communication modules 123 and 124 are described in the first embodiment, and thus the description thereof will be omitted.

In addition, the multi-antenna communication module 123 as the reception side of the wireless communication compares reception power of the reception signal in the direction UP opposite to the perspective direction SP with the reception power of the reception signal in the direction TP opposite to the direction LP of the reflection angle at the reflection position RP on the coil 122, and may determine the direction of the greater reception power as the direction for forming the directivity of the reception signal. In addition, the description described above can be similarly performed even if the respective multi-antenna communication modules of the transmission side and the reception side of the wireless communication have reverse configurations.

Thus, for example, the wireless module 111 of the transmission side of the present embodiment determines the direction of the beam of the transmission signal as the perspective direction SP or the reflection direction RP according to the shift amount φ of the respective central axes C1 and C2 of the coils 121 and 122, and forms the directivity of the beam of the transmission signal in the determined direction. Further, for example, the wireless module 112 of the reception side of the present embodiment determines the direction of the beam of the reception signal as the direction UP opposite to the perspective direction or the direction TP opposite to the direction LP of the reflection angle according to the shift amount φ of the respective central axes C1 and C 2 of the coils 121 and 122, and forms the directivity of the reception signal in the determined direction.

Thus, the wireless modules 111 and 112 of the present embodiment can suppress quality deterioration in the wireless communication and realize high speed wireless communication even when an obstacle (for example, another coil) exists between two multi-antenna communication modules 123 and 124.

Third Embodiment

Figure 11:
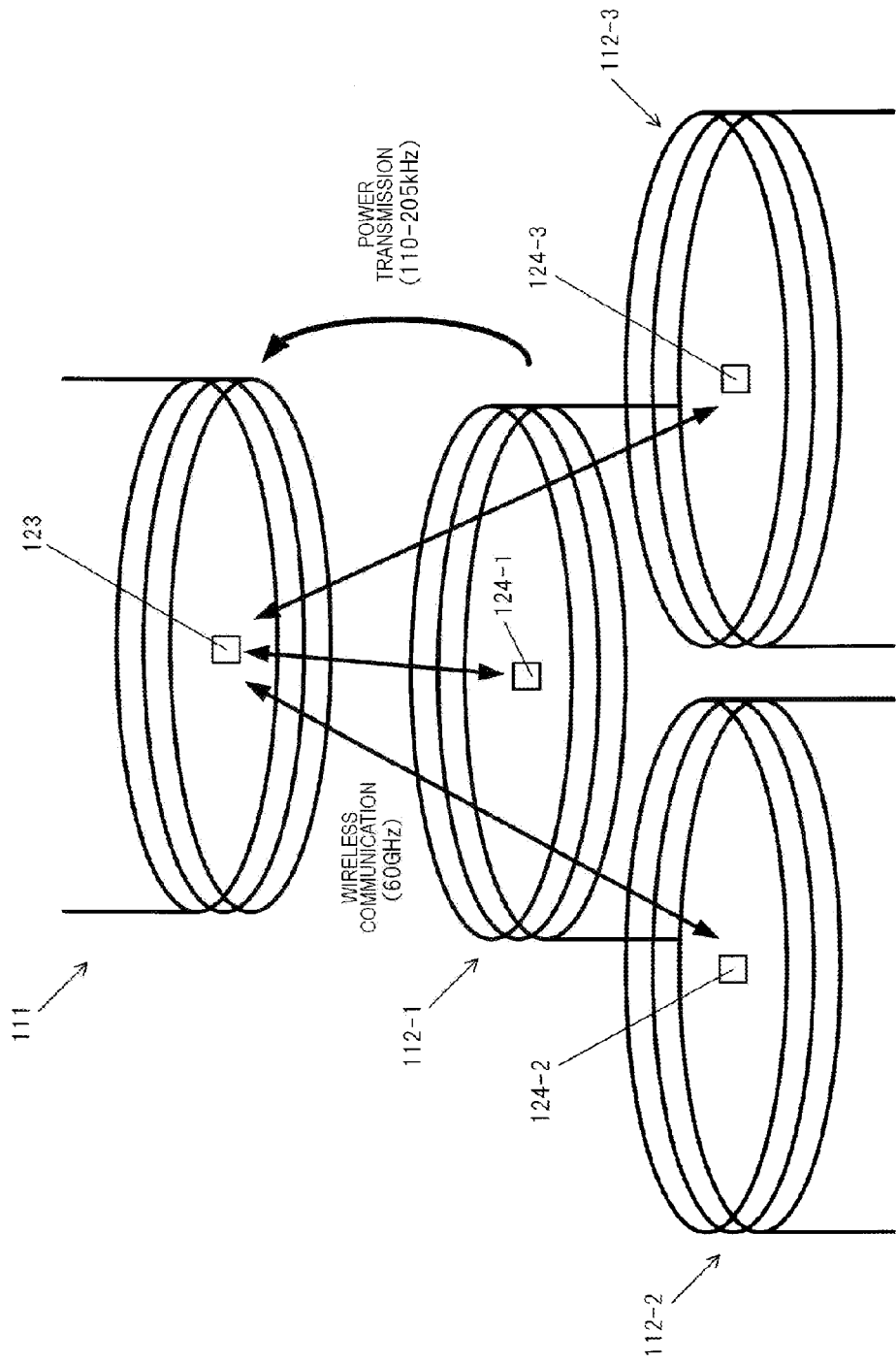
FIG. 11 is diagram illustrating a state in which one wireless module provided in the mobile terminal and a plurality of wireless modules provided in the pad terminal perform non-contact charging and wireless communication.
Figure 12:
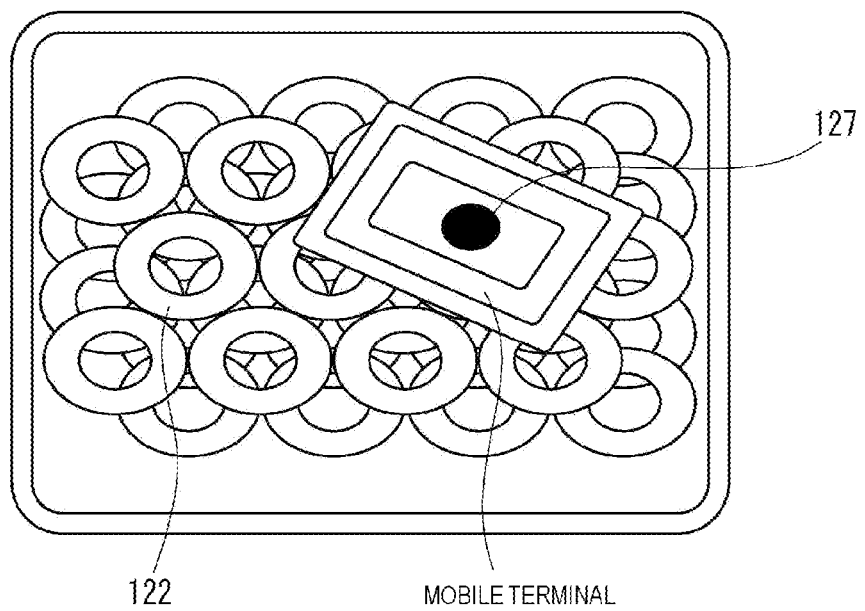
FIG. 12 is a top view illustrating a state in which the mobile terminal including one wireless module and the pad terminal including the plurality of wireless modules perform wireless communication.

FIG. 11 is a diagram illustrating an aspect in which one wireless module 111 provided in the mobile terminal and a plurality of wireless modules 112-1, 112-2, and 112-3 provided in the pad terminal perform non-contact charging and wireless communication with each other. FIG. 12 is a top view illustrating an aspect in which the mobile terminal including one wireless module 111 and the pad terminal including the plurality of wireless modules 112-1, 112-2, and 112-3 perform wireless communication.

Although the beamforming between the one multi-antenna communication module inside the mobile terminal and the one multi-antenna communication module inside the pad terminal has been made according to the positions of the respective coils of the mobile terminal and the pad terminal, in the respective first and second embodiments, the beamforming is not made sufficiently by the positions of the respective coils of the mobile terminal and the pad terminal, and thus the quality in wireless communication deteriorates in some cases.

In the present embodiment, the pad terminal includes the plurality of wireless modules 112-1, 112-2, and 112-3, and includes the plurality of multi-antenna communication modules so as to form a coil array (see FIG. 12). When the mobile terminal is placed on the pad terminal, the multi-antenna communication module 123 inside the mobile terminal performs beamforming similarly to the method described in the first or second embodiment, between the respective multi-antenna communication modules 124-1, 124-2, and 124-3 inside the pad terminal.

Thus, the wireless module 111 provided in the mobile terminal, as compared to the case where the pad terminal includes the one wireless module 112, can further suppress the quality deterioration in the wireless communication with the respective multi-antenna communication modules 124-1, 124-2, and 124-3 of the plurality of wireless modules 112-1, 112-2, and 112-3 provided in the pad terminal so as to realize high speed wireless communication.

Fourth Embodiment

Figure 13:
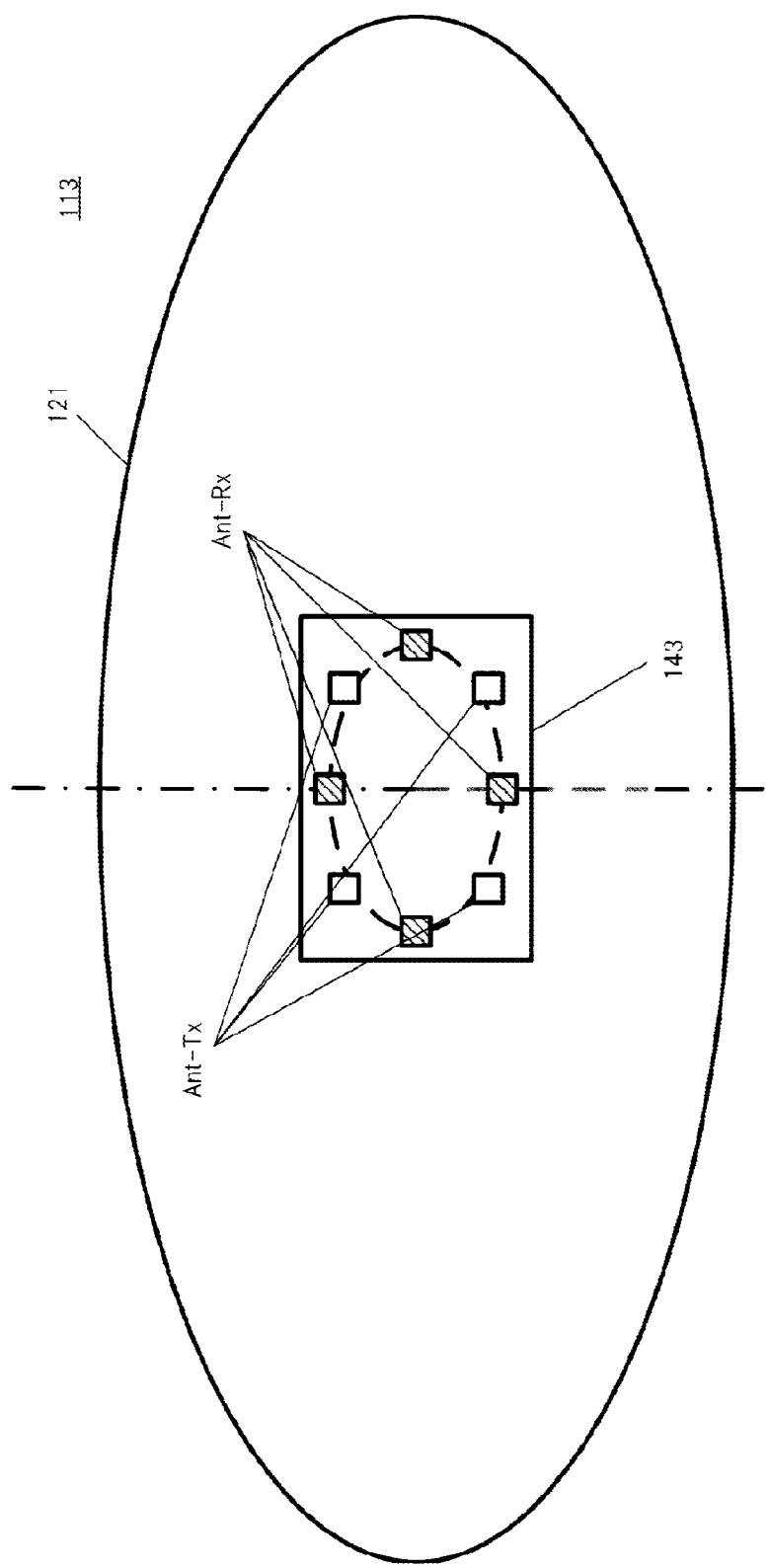
FIG. 13 is a diagram illustrating a wireless module in which a multi-antenna communication module includes a plurality of transmission antenna elements and reception antenna elements.
Figure 14:
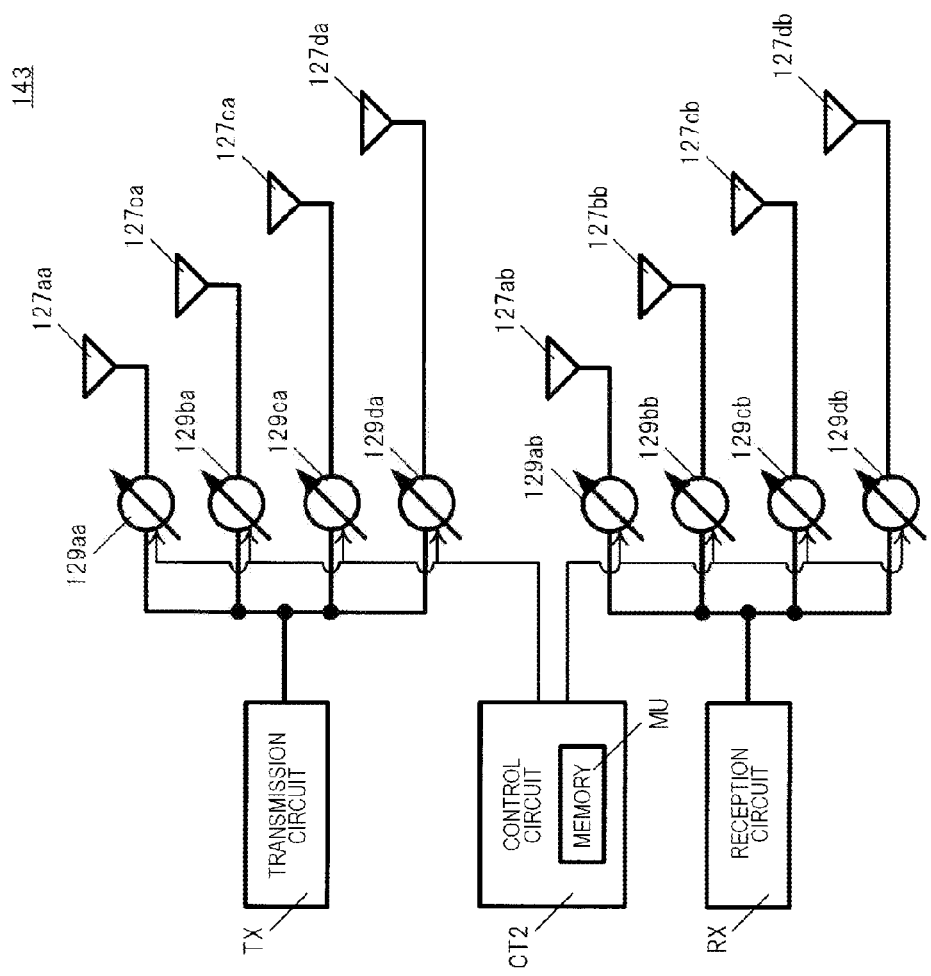
FIG. 14 is a block diagram illustrating an internal configuration of the multi-antenna communication module including the plurality of transmission antenna elements and reception antenna elements.
Figure 15:
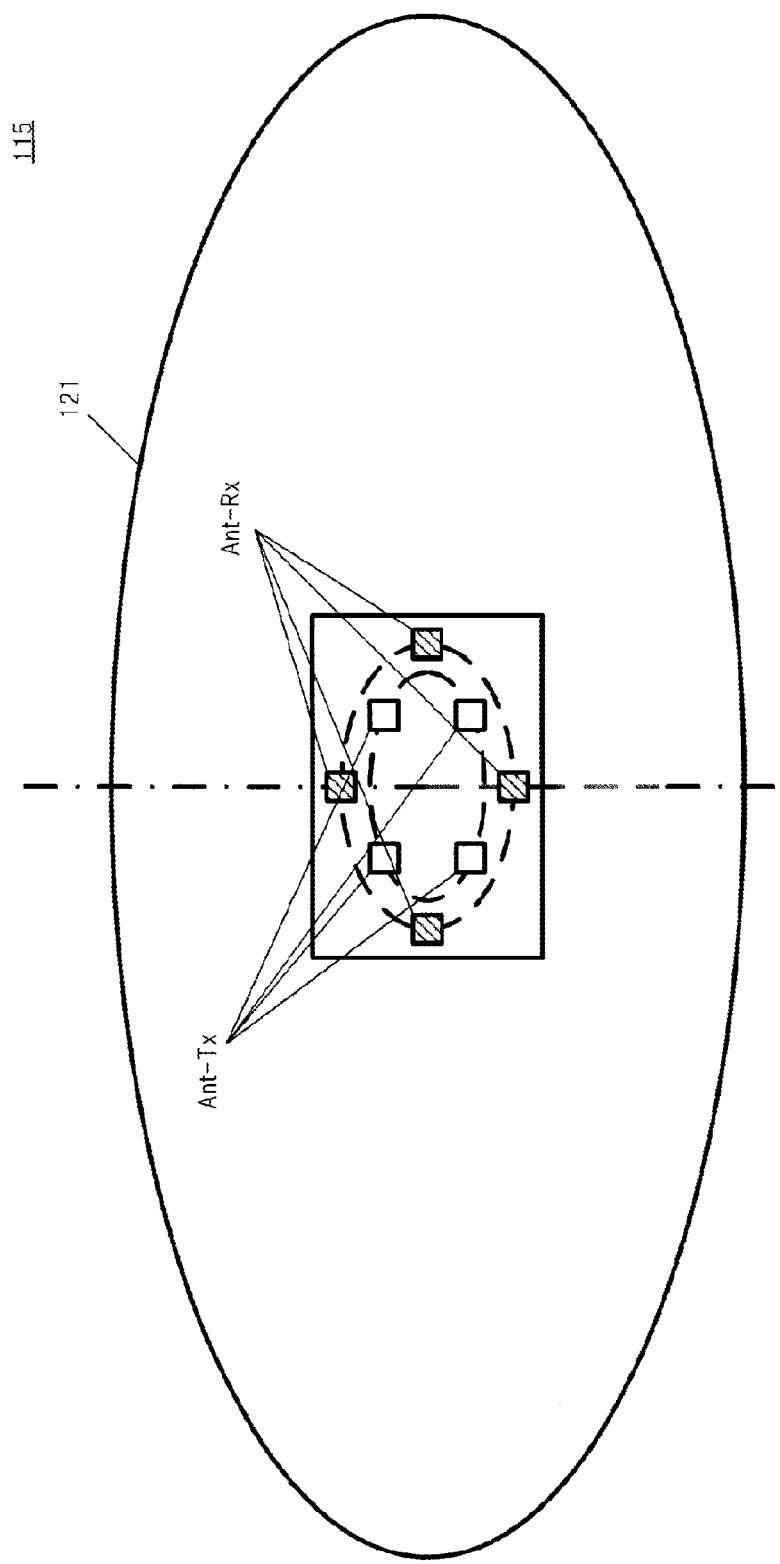
FIG. 15 is a diagram illustrating a wireless module in which the multi-antenna communication module includes the plurality of transmission antenna elements and reception antenna elements which are arranged in a plurality of different concentric circles.

FIG. 13 is a diagram illustrating a wireless module in which a multi-antenna communication module 143 includes a plurality of transmission antenna elements Ant-Tx and reception antenna elements Ant-Rx. FIG. 14 is a block diagram illustrating an internal configuration of the multi-antenna communication module 143 including the plurality of transmission antenna elements Ant-Tx and reception antenna elements Ant-Rx. FIG. 15 is a diagram illustrating a wireless module 115 in which the multi-antenna communication module 143 includes the plurality of transmission antenna elements Ant-Tx and reception antenna elements Ant-Rx which are arranged on a plurality of different concentric circles.

Although the antenna elements 127 and 128 are shared as the antenna for transmission and reception in the respective first to third embodiments, in the present embodiment, the multi-antenna communication module 143 includes the transmission antenna elements Ant-Tx as the antenna for transmission, and the reception antenna elements Ant-Rx as the antenna for reception (see FIG. 13). In addition, the plurality of transmission antenna elements Ant-Tx and the plurality of reception antenna elements Ant-Rx may be arranged in the shape of the same concentric circle (see FIG. 13) or may be arranged in the shape of the different concentric circles (see FIG. 15).

In addition, when the plurality of transmission antenna elements Ant-Tx and the plurality of reception antenna elements Ant-Rx are arranged in the shape of the plurality of different concentric circles, any antenna element among the plurality of transmission antenna elements Ant-Tx and the plurality of reception antenna elements Ant-Rx may be arranged in the inside or the outside.

The multi-antenna communication module 143 as a wireless communication unit includes a transmission circuit TX, a reception circuit RX, a control circuit CT2, a plurality of (for example, four) transmission antenna elements 127aa, 127ba, 127ca, and 127da, phase shifters 129aa, 129ba, 129ca, and 129da of the same number as that of the transmission antenna elements, a plurality of (for example, four) reception antenna elements 127ab, 127bb, 127cb, and 127db, and phase shifters 129ab, 129bb, 129cb, and 129db of the same number as that of the reception antenna elements. The different contents between the operations of the respective units of the multi-antenna communication module 143 illustrated in FIG. 14 and the multi-antenna communication module 123 illustrated in FIG. 4 will be described later, and the description of identical contents will be omitted or simplified.

In the multi-antenna communication module 143, the switch SW illustrated in FIG. 4 is not included, and the control circuit CT2 outputs a control signal for giving a delay amount of a different phase to the transmission signal generated by the transmission circuit TX to the respective phase shifters 129aa, 129ba, 129ca, and 129da. Further, the control circuit CT2 outputs a control signal for giving a delay amount of a different phase to the reception signals received by the reception antenna elements 127ab, 127bb, 127cb, and 127db to the respective phase shifters 129ab, 129bb, 129cb, and 129db.

The phase shifter 129aa gives a delay amount of a predetermined phase to the transmission signal generated by the transmission circuit TX according to the control signal which is an output of the control circuit CT2, and outputs the transmission signal to the transmission antenna element 127aa. In addition, since the operations of the other phase shifters 129ba, 129ca, and 129da are the same as the operation of the phase shifter 129aa, the description thereof will be omitted, but the delay amounts of the phase given by the respective phase shifters 129aa, 129ba, 129ca, and 129da are different.

The phase shifter 129ab gives a delay amount of a predetermined phase to the reception signal received by the reception antenna element 127ab according to the control signal which is an output of the control circuit CT2, and outputs the reception signal to the reception circuit RX. In addition, since the operations of the other phase shifters 129bb, 129cb, and 129db are the same as the operation of the phase shifter 129ab, the description thereof will be omitted, but the delay amounts of the phase given by the respective phase shifters 129ab, 129bb, 129cb, and 129db are different.

The transmission antenna element 127aa transmits the transmission signal to which a delay amount of a predetermined phase is given by the phase shifter 129aa according to the control signal which is an output of the control circuit CT2. In addition, since the operations of other transmission antenna elements 127ba, 127ca, and 127da are the same as the operation of the transmission antenna element 127aa, and the descriptions thereof will be omitted.

The reception antenna element 127ab receives the transmission signal transmitted from the transmission antenna element of the wireless module provided inside the pad terminal, and outputs the received transmission signal to the phase shifter 129ab. In addition, since the operations of the other reception antenna elements 127bb, 127cb, and 127db are the same as that of the reception antenna element 127*ab*, the description thereof will be omitted.

In addition, although FIG. 14 illustrates, for example, the multi-antenna communication module 143 of the wireless module 113 provided inside the mobile terminal, the multi-antenna communication module of the wireless module provided inside the pad terminal has the same configuration as that of the multi-antenna communication module 143, and thus the description of the multi-antenna communication module of the wireless module provided inside the pad terminal will be omitted.

Thus, even if the antenna element for transmission and the antenna element for reception are different antenna element, the wireless module of the present embodiment can perform non-contact charging with the wireless module provided in the opposing apparatus, similarly to the respective first to third embodiments, and suppress the quality deterioration in the wireless communication and realize high speed wireless communication.

The foregoing has described the various embodiments with reference to the drawings however, the present disclosure is not limited to the embodiments. It is apparent that those skilled in the art can derive variations and modifications within the scope described in the claims, and it is conceivable that the variations and modifications also belong to the technical scope of the present disclosure.

The pad terminals of the wireless modules of the respective first to fourth embodiments described above may be provided, for example, in the inside of the desk in front of the seat of a Shinkansen or an airplane. Thus, the user's mobile terminal placed on the pad terminal can perform non-contact charging between the respective wireless modules provided in the inside of the mobile terminal and the pad terminal, in the Shinkansen or the airplane, and communicate a large amount of data at high speed in a wireless manner.

For example, even if the large amount of data (for example, movies, television programs, and music content) is stored in advance in the inside of the table in front of the seat of the Shinkansen or the airplane, the mobile terminal is charged by placing the mobile terminal on the pad terminal, and thus the user does not have to mind a remaining battery life of the mobile terminal. Further, if a browser is started in response to the user's input operation, the mobile terminal may display information regarding each product district (for example, souvenirs). Further, for example, when an earphone jack is connected, the wireless module may perform wireless communication.

The pad terminal including the wireless modules of the respective first to fourth embodiments may be provided in, for example, the inside of the table of a coffee shop. Thus, the user's mobile terminal placed on the pad terminal can perform non-contact charging between the respective wireless modules provided in the inside of the mobile terminal and the pad terminal, in the coffee shop, and communicate a large amount of data at high speed in a wireless manner. Further, if a browser is started in response to the user's input operation, the mobile terminal may display information regarding advertisement of the coffee shop itself or undertook advertisement.

Further, the pad terminal including the wireless modules of the respective first to fourth embodiments may be provided in, for example, the inside of the table between seats of a movie theater. Thus, the user's mobile terminal placed on the pad terminal can perform non-contact charging between the respective wireless modules provided in the inside of the mobile terminal and the pad terminal, in the movie theater, and communicate a large amount of data at high speed in a wireless manner.

The mobile terminal may display, for example, a notice of the next film or a discount coupon before the movie begins, or may perform online sales of electronic pamphlets. Further, the mobile terminal may perform non-contact charging while a movie is being watched, or may check the state in which the screen of the mobile terminal is dark.

The present application is based on Japanese Patent Application No. 2012-272647 filed on Dec. 13, 2012, the contents of which are incorporated by reference in the present application.

INDUSTRIAL APPLICABILITY

The present disclosure is useful as a wireless module and a wireless communication apparatus which perform non-contact charging with an opposing apparatus and perform wireless communication at a high speed with an opposing apparatus by a simple configuration, without performing a highly accurate alignment with the opposing apparatus.

REFERENCE SIGNS LIST 111, 112: WIRELESS MODULE
121, 122: COIL
123, 124: MULTI-ANTENNA COMMUNICATION MODULE
125, 126: SUBSTRATE
127, 127*a*, 127*b*, 127*c*, 127*d*, 128, 128*a*, 128*b*, 128*c*, 128*d*: ANTENNA ELEMENT
127*aa*, 127*ba*, 127*ca*, 127*da*, Ant-TX: TRANSMISSION ANTENNA ELEMENT
127*ab*, 127*bb*, 127*cb*, 127*db*, Ant-RX: RECEPTION ANTENNA ELEMENT
129*a*, 129*b*, 129*c*, 129*d*, 129*aa*, 129*ba*, 129*ca*, 129*da*, 129*ab*, 129*bb*,
129*cb*, 129*db*: PHASE SHIFTER
131: CAPACITOR
132: POSITION DETECTION UNIT
133] RECTIFYING DIODE
135: SMOOTHING CAPACITOR
137: CHARGING CONTROL CIRCUIT
139: BATTERY
AC: ALTERNATING CURRENT POWER SOURCE
CT, CT2: CONTROL CIRCUIT
DEV: MOBILE TERMINAL
PAD: PAD TERMINAL
RX: RECEPTION CIRCUIT
SW: SWITCH
TX: TRANSMISSION CIRCUIT

What is claimed is:

1. A wireless module comprising:
a non-contact charging unit, configured to transmit power to an opposing apparatus through a coil in a non-contact manner; and
a wireless communication unit including a plurality of wireless communication antennas,
wherein the plurality of wireless communication antennas are arranged at substantially regular intervals from a center of a central axis of the coil, and
wherein the wireless communication unit transmits data from the respective wireless communication antennas by wireless communication when the non-contact charging unit transmits power to the opposing apparatus.

2. The wireless module according to claim 1, wherein
the non-contact charging unit receives power transmitted from the opposing apparatus through the coil, and
wherein the wireless communication unit receives data transmitted from the opposing apparatus in the respective wireless communication antennas when the non-contact charging unit receives power which is output by the opposing apparatus.

3. The wireless module according to claim 2, wherein
the non-contact charging unit further includes a detection unit, configured to detect a shift between central axes of the coil and a coil of the opposing apparatus, and
wherein the wireless communication unit further includes a control unit, configured to give different phase differences to transmission signals which are outputs of the respective wireless communication antennas depending on the shift, and to form a beam in a predetermined direction to a transmission signal which is an output of the wireless communication unit.

4. The wireless module according to claim 3, wherein
the control unit gives different phase differences to reception signals which are received by the respective wireless communication antennas depending on the shift, and forms directivity of a reception signal in a direction opposite to a direction of a beam of a transmission signal which is an output of the opposing apparatus.

5. The wireless module according to claim 4, wherein
in a case where the opposing apparatus includes a plurality of coils, the non-contact charging unit receives power transmitted from any one of the coils of the opposing apparatus, and
in a case where the opposing apparatus includes a plurality of wireless communication units, the wireless communication unit receives data transmitted from the respective wireless communication units of the opposing apparatus.

6. The wireless module according to claim 1, wherein the plurality of wireless communication antennas include antennas for transmission and antennas for reception.

7. A wireless communication apparatus comprising
a wireless module that includes:
a non-contact charging unit, configured to transmit power to an opposing apparatus through a coil in a non-contact manner; and
a wireless communication unit including a plurality of wireless communication antennas,
wherein the plurality of wireless communication antennas are arranged at substantially regular intervals from a center of a central axis of the coil, and
wherein the wireless communication unit transmits data from the respective wireless communication antennas by wireless communication when the non-contact charging unit transmits power to the opposing apparatus.

\* \* \* \* \*